(12) United States Patent
Pohlman et al.

(10) Patent No.: US 8,959,693 B2
(45) Date of Patent: Feb. 24, 2015

(54) MODULAR SYSTEM FOR ASSEMBLING RAMPS, DECKS, AND OTHER RAISED STRUCTURES

(71) Applicants: Joe Kipton Pohlman, Huntersville, NC (US); Brian Joseph Demers, Huntersville, NC (US); Robert L. Burns, Festus, MO (US); Sylvian Bryan, Miami, FL (US)

(72) Inventors: Joe Kipton Pohlman, Huntersville, NC (US); Brian Joseph Demers, Huntersville, NC (US); Robert L. Burns, Festus, MO (US); Sylvian Bryan, Miami, FL (US)

(73) Assignee: Lowes Companies, Inc., Mooresville, NC (US)

( * ) Notice: Subject to any disclaimer, the term of this patent is extended or adjusted under 35 U.S.C. 154(b) by 0 days.

(21) Appl. No.: 13/763,020

(22) Filed: Feb. 8, 2013

(65) Prior Publication Data
US 2013/0198978 A1     Aug. 8, 2013

Related U.S. Application Data

(60) Provisional application No. 61/596,526, filed on Feb. 8, 2012.

(51) Int. Cl.
| E01D 1/00 | (2006.01) |
|---|---|
| E01D 21/00 | (2006.01) |
| E04F 11/00 | (2006.01) |
| B65G 69/30 | (2006.01) |

(52) U.S. Cl.
CPC ...... *E01D 1/00* (2013.01); *E01D 21/00* (2013.01); *B65G 69/30* (2013.01); *E04F 11/002* (2013.01); *E04F 2011/007* (2013.01); *E04F 2011/005* (2013.01)

USPC ........................................ 14/69.5; 193/38

(58) Field of Classification Search
CPC .......... B65G 69/30; E01D 1/00; E01D 21/00; E04F 11/002; E04F 2011/005; E04F 2011/007
USPC ........................................ 14/69.5; 193/38
See application file for complete search history.

(56) References Cited

U.S. PATENT DOCUMENTS

| 4,807,317 | A | * | 2/1989 | Quinn et al. | .......... 14/69.5 |
|---|---|---|---|---|---|
| 5,106,237 | A | | 4/1992 | Meldrum | |
| 5,214,817 | A | * | 6/1993 | Allen | .......... 14/69.5 |
| 5,740,575 | A | | 4/1998 | Gordon | |
| 6,526,614 | B2 | | 3/2003 | Anderson et al. | |
| 7,240,388 | B2 | | 7/2007 | Warford | |
| 7,302,725 | B2 | * | 12/2007 | Thygesen | .......... 14/69.5 |
| 7,454,811 | B1 | | 11/2008 | Stotka | |

(Continued)

FOREIGN PATENT DOCUMENTS

GB     2362630 A     5/2000

OTHER PUBLICATIONS

Canadian Intellectual Property Office, Office Action, Application No. 2,805,149, dated Feb. 7, 2014.

(Continued)

*Primary Examiner* — Raymond W Addie
(74) *Attorney, Agent, or Firm* — Kilpatrick Townsend & Stockton LLP

(57) ABSTRACT

Embodiments of the present invention provide a modular, portable, and adjustable wheelchair ramp that provides advantages and benefits over current wheelchair ramps. The ramp may be sold in a kit with individual elements, but it is also designed to provide a frame substructure that can be used with conventional decking materials, railings, and handrails.

40 Claims, 30 Drawing Sheets

(56) References Cited

U.S. PATENT DOCUMENTS

| | | |
|---|---|---|
| 7,607,186 B1 * | 10/2009 | Mitchell ........................ 14/69.5 |
| 8,074,314 B2 * | 12/2011 | Lucht ............................. 14/69.5 |
| 2004/0034950 A1 | 2/2004 | Massaro |
| 2004/0133998 A1 * | 7/2004 | Sloniker et al. ................ 14/69.5 |
| 2006/0010621 A1 | 1/2006 | Wentz et al. |
| 2006/0059636 A1 * | 3/2006 | Suggate ........................ 14/69.5 |
| 2009/0255066 A1 * | 10/2009 | Brock ............................ 14/69.5 |
| 2010/0146871 A1 | 6/2010 | Carson |
| 2012/0036653 A1 * | 2/2012 | Peters ............................ 14/69.5 |
| 2013/0047352 A1 * | 2/2013 | Corfield ........................ 14/69.5 |
| 2013/0055511 A1 * | 3/2013 | McGivern et al. ............. 14/69.5 |

OTHER PUBLICATIONS

Canadian Intellectual Property Office, Office Action, Application No. 2,805,149, dated Dec. 3, 2014.

* cited by examiner

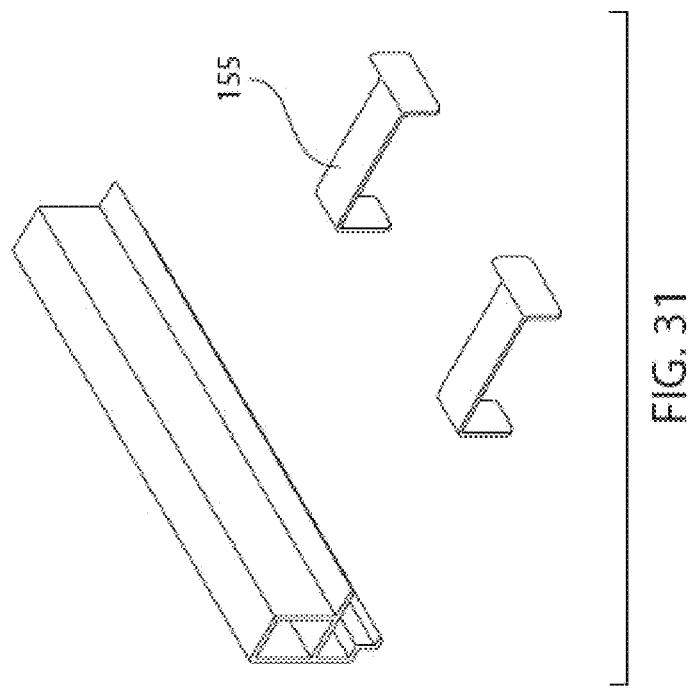

MODULAR SYSTEM FOR ASSEMBLING RAMPS, DECKS, AND OTHER RAISED STRUCTURES

CROSS-REFERENCE TO RELATED APPLICATION

This application claims priority to U.S. Provisional Patent Application Ser. No. 61/596,526, filed on Feb. 8, 2012, which is hereby incorporated by reference as though fully set forth herein.

FIELD OF THE INVENTION

Embodiments of the present invention relate generally to modular ramps, decks, and other raised structures, and to methods, systems, and kits for the assembly of ramps, decks, and other raised systems. In embodiments where the system relates to modular ramps such as modular wheelchair ramps, the ramps may be incorporated into a deck, porch, or other structure in order to provide access to a home, building, or other structure. In addition to modular ramps, the assemblies may also be used to create other raised structures, such as a deck, a temporary deck structure, a patio structure, or other structures that benefit, for example, from being assembled in a modular nature in a raised configuration or on uneven terrain.

BACKGROUND

Wheelchair ramps are often used to allow wheelchair access to raised structures that would otherwise require steps, stairs, an elevator, or a lift to access. Examples of such structures include decks, platforms, houses, modular buildings, trailer-style buildings, or any other elevated structure. Most of these structures are raised from ground level such that there is a first "lower" or "ground access" level and a second "upper" or "destination" level, with the levels being of different elevations such that steps or a ramp are needed to advance from the first level to the second level.

Many wheelchair ramps are permanent structures that are formed of concrete, much like an inclined sidewalk. Other wheelchair ramps are constructed solely from lumber or similar wood products by building a frame and then positioning the ramp portions on the frame. Other ramps are modular, formed of a series of separate walkway pieces that are secured to one another at varying levels of inclination.

Although there are a few options of modular wheelchair ramps available, there exists a need for improved wheelchair ramp systems. Some embodiments of the invention described herein seek to provide wheelchair ramp systems that provide a number of advantages over existing systems.

Likewise, it would be beneficial to have additional ways to construct decks, patios, or other raised structures including ways to construct such structures on uneven terrain. Thus, some embodiments of the present invention also seek to provide modular systems for assembling ramps, decks, patios, and other raised structures.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Various embodiments of the present invention relate to modular systems for assembling raised structures such as ramps, wheelchair ramps, decks, and patios, to components of such systems, and to methods of assembling such raised structures. While one of the most likely uses of the modular systems described herein is to provide wheelchair ramps for access to an elevated surface or structure, it should be understood that some embodiments of modular systems can be used for other purposes as well. For example, some embodiments of ramp systems can be used to provide an alternative way to reach an elevated structure where wheelchair access is not necessarily required by law or regulation. As another example, modular systems of the present invention can be used to construct decks, patios, and other raised or elevated structures. While the term "modular" is used herein to characterize the various systems, it should be understood that a single module can provide a complete ramp system to permit a person to reach an elevated surface or structure, or a complete deck, or other complete elevated structure.

In some embodiments, modular systems of the present invention are portable such that they can be readily moved from one location to another. Modular systems of the present invention, in some embodiments, can be semi-permanent such that they are not easily moved or disassembled.

Modular systems of the present invention, in some embodiments, can advantageously be used with dimensional lumber. As used herein, "dimensional lumber" refers to lumber that is molded or finished/planed and cut to standardized widths and depths (e.g., 2×4, 2×6, 2×8 s, ⅝×6 s (in approximate inches) etc.). Further, as used herein, dimensional lumber is not limited to solid hardwoods but also includes engineered wood products, composite materials, and other available hardwood substitutes. Dimensional lumber can be used, for example, on a substructure of a ramp system to provide the ramp portion or on a deck substructure to provide decking. The compatibility with dimensional lumber, in some embodiments, advantageously allows a consumer to purchase the substructure and then select his or her own preferred lumber for the ramp, deck, or surface portion. Likewise, the compatibility with dimensional lumber, in some embodiments, allows a manufacturer or seller to focus on providing substructure components without having to acquire and package ramp, deck, or surface portion components with the substructure components.

Some embodiments of modular systems, such as ramp systems, can advantageously be compatible with conventional railing. In other words, in some embodiments, consumers can separately select and install conventional railing on ramp systems of the present invention. In such embodiments, various components of the ramp system can be designed and dimensioned so as to allow for installation of conventional railing.

In some embodiments, modular systems of the present invention can be provided as kits with only certain elements of the system. For example, such kits might include only a frame substructure that can be combined with conventional decking materials, railings, and handrails.

In some embodiments, systems of the present invention are designed to be assembled as a portable or temporary deck or patio structure, such that the structure can be easily assembled for temporary access or enjoyment.

Certain embodiments of the invention provide a modular system comprising: (a) a plurality of adjustable structures, each adjustable structure comprising: (i) first and second legs; (ii) a bar configured to span a width between the legs; (iii) a first adjustable member (e.g., a first adjustable sleeve) configured to cooperate with the first leg and a second adjustable member (e.g., a second adjustable sleeve) configured to cooperate with the second leg, wherein the first adjustable member (e.g., the first adjustable sleeve) is adapted to receive a first end of the bar and the second adjustable member (e.g., the second adjustable sleeve) is adapted to receive a second end of the bar in order to create a frame, wherein movement of the first and second adjustable members (or sleeves) with respect to the first and second legs causes relative movement of the bar to varying height positions. They also include first and second side rails connecting a first adjustable structure to a second adjustable structure, wherein the first side rail cooperates with the first adjustable member (or sleeve) on the first adjustable structure and the first adjustable member (or sleeve) on the second adjustable structure, and wherein the second side rail cooperates with the second adjustable member (or sleeve) on the first adjustable structure and the second adjustable member (or sleeve) on the second adjustable structure, such that movement of one of the adjustable members (or sleeves) relative to its corresponding leg adjusts the height of the side rail. As noted above, such a modular system can be a modular ramp system, or a modular deck system, or other modular system for assembling a raised structure.

In another embodiment, a modular system for assembling a ramp, deck, or other raised structure comprises: (a) a plurality of adjustable structures, each adjustable structure comprising: (i) first and second legs; (ii) a bar configured to span a width between the legs; (iii) adjustable members (e.g., adjustable sleeves), each of which is configured to cooperate with a respective one of the first and second legs, wherein the adjustable members (or sleeves) cooperate with respective ends of the bar; (b) first and second side rails configured to connect to a first of the adjustable structures separated a distance from a second of the adjustable structures, wherein the side rails span the distance between the first adjustable structure and the second adjustable structure, wherein the bar and the side rails cooperate with the adjustable members (or sleeves), such that movement of one of the adjustable members (or sleeves) relative to its corresponding leg adjusts the height of corresponding ends of the bar and of the side rail in cooperation with the adjustable member (or sleeve); and (c) a joist configured to be positioned between the first adjustable structure and the second adjustable structure and between the side rails, wherein the joist has two ends, and wherein a first end of the joist is positioned on the bar in the first adjustable structure and the second end of the joist is positioned on the bar in the second adjustable structure.

Another embodiment provides a modular system for assembling a ramp, deck, or other raised structure comprising: (a) at least two adjustable structures, each adjustable structure comprising an H-frame with: (i) first and second legs; (ii) a bar configured to span a width between the legs; (iii) first and second adjustable members (e.g., adjustable sleeves) configured to cooperate with the first and second legs, respectively, and to support the bar; (b) at least one joist configured to be coupled to the bar of a first H-frame and to the bar of a second H-frame, wherein the joist has two ends with each end comprising a hook-like structure that limits the rotation of the joist relative to at least one of the bars.

The modular systems, in some embodiments, may also have at least one extender insert configured to cooperate with at least one leg, wherein the height of the extender insert is adjustable relative to the leg; at least one post sleeve (or other item of post décor) configured to be positioned over and/or around each leg and extender insert; at least one post cap; and/or at least one threshold.

The adjustable members (or sleeves) may each have (i) a coarse height adjustment structure configured to allow the position of the adjustable member (or sleeve) to move and selectively be locked in pre-specified increments with respect to its corresponding leg and (ii) a fine height adjustment structure configured to allow the position of the adjustable member (or sleeve) to move and selectively be locked in increments smaller than the coarse height adjustment structure relative to its corresponding leg. The coarse height adjustment structure may allow the position of the adjustable member (or sleeve) to move and selectively be locked in pre-determined increments with respect to its corresponding leg.

The modular system components described herein may be provided in sets or kits, with specific elements configured to be assembled in order to build ramps or decks of desired dimensions. For example, in a modular ramp system, the elements might be configured to build a ramp of a predetermined length. In a general sense, the modular ramp systems described herein comprise a ramp frame substructure, wherein the ramp frame substructure comprises a series of frame elements configured to receive a plurality of deck boards to form the ramp. As another example, a modular deck system may comprise a deck frame substructure, wherein the deck frame substructure comprises a series of frame elements configured to receive a plurality of deck boards to form the deck.

Other embodiments relate to methods of assembling a ramp, deck, or other raised structure that comprise, for example: (a) erecting an adjustable frame substructure; (b) positioning a plurality of deck boards on the frame substructure, wherein the deck boards have a cross-sectional height of less than 4 inches and a cross-sectional width of less than 8 inches. In other embodiments, methods of assembling a ramp, deck, or other raised structure can comprise: (a) erecting an adjustable frame substructure, comprising (i) positioning a first set of two legs on a surface, (ii) sliding an adjustable member (e.g., an adjustable sleeve) on each leg and securing the adjustable member (or sleeve) at a desired height using a coarse height adjustment structure; (iii) positioning a bar to span a width between the two legs such that the bar cooperates with the adjustable members (or sleeves) to create a first frame; (iv) positioning a second set of two legs, adjustable members (or sleeves), and a bar to create a second frame a distance from the first frame; (v) positioning a set of two side rails to span the distance between the first frame and the second frame; (vi) positioning at least one joist between the first frame and the second frame, wherein the joist has two ends, wherein a first end of the joist is positioned on the bar in the first frame and the second end of the joist is positioned on the bar in the second frame; and (b) positioning a plurality of deck boards on the frame substructure.

These and other embodiments are presented in greater detail in the detailed description which follows.

BRIEF DESCRIPTION OF THE DRAWINGS

FIG. 31 shows an exploded perspective view of an embodiment of joist-to-cover support brackets and a rail cover.

DETAILED DESCRIPTION

Figure 1:
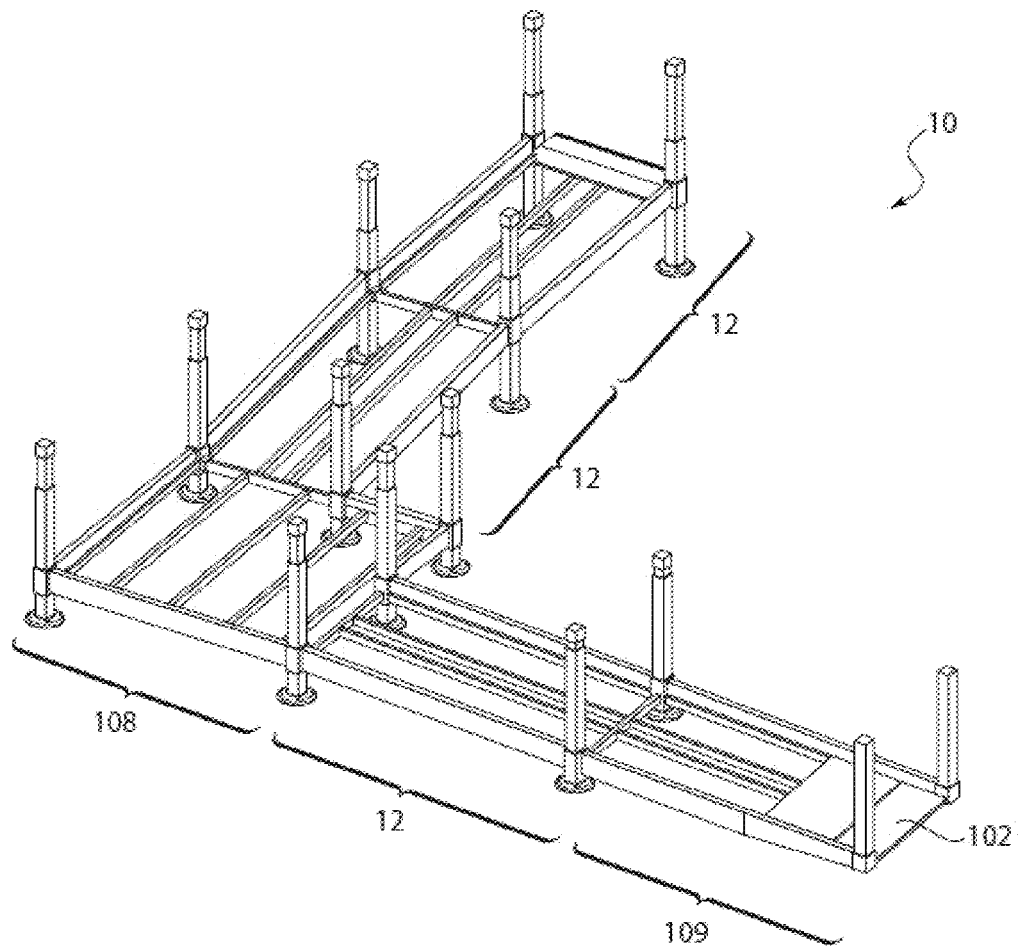
FIG. 1 shows a side perspective view of a plurality of adjustable wheelchair ramp structures assembled together.

The subject matter of embodiments of the present invention is described here with specificity to meet statutory requirements, but this description is not necessarily intended to limit the scope of future claims. The subject matter to be claimed may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention relate to modular systems for assembling raised structures such as ramps, wheelchair ramps, decks, and patios, to kits used in such modular systems, and to methods for assembling raised structures such as ramps, wheelchair ramps, decks, and patios. While one of the most likely uses of the modular systems described herein is to provide wheelchair ramps for access to an elevated surface or structure, it should be understood that some embodiments of modular systems can be used for other purposes as well. For example, some embodiments of ramp systems can be used to provide an alternative way to reach an elevated structure where wheelchair access is not necessarily required by law or regulation. As another example, modular systems of the present invention can be used to construct decks, patios, and other raised or elevated structures. While the term "modular" is used herein to characterize the various systems, it should be understood that a single module can provide a complete ramp system to permit a person to reach an elevated surface or structure, or a complete deck, or other complete elevated structure.

In some embodiments, modular systems of the present invention comprise modular wheelchair ramp systems. In other words, in such embodiments, the modular ramp systems can accommodate individual in wheelchairs. In some embodiments, the modular ramp systems are compliant with the American with Disabilities Act ("ADA") Accessibility Guidelines for Buildings and Facilities. For example, as of the date of this filing, wheelchair ramps must have a minimum width of 36 inches, landings must be at least 60×60 inches, the maximum slope of any new ramp is 1:12, and the maximum rise for any run is 30 inches. See e.g., http://wvvw.access-board.gov/adaag/html/adaag.htm#4.8. To the extent that other countries or governments have similar requirements for wheelchair accessibility, some embodiments of modular ramp systems of the present invention can likewise be compatible with those requirements.

In other embodiments, the assemblies may also be used to create a raised structure, such as a temporary deck structure, patio structure, or any other structure that benefits from being assembled in a modular nature and/or in a raised configuration. Although much of the description associated with the Figures focuses on embodiments related to ramps or wheelchair ramps in particular, it should be understood that only slight modifications need be made to the structure components in order to create any type of raised platform, deck, or patio structure. A few appropriate modifications are described at the end of this document, but it should be understood that other modifications are possible and considered within the scope of this disclosure. It should also be understood that where the use of the term "ramp" is used in this document, it may also be applicable to a flat or "deck-like structure" embodiment, and is not intended to be interpreted to require a particular slope.

In some embodiments, a ramp system comprises a plurality of adjustable structures that can be assembled in order to form a modular ramp system. The ramp is height adjustable, and in some embodiments, width adjustable. In some embodiments, the ramp is also optionally incline-adjustable, meaning that the slope of the ramp can be adjusted. The adjustability of the incline may be limited in some embodiments so as, for example, to comply with the ADA Accessibility Guidelines for Buildings and Facilities. For example, the ADA Accessibility Guidelines require that a wheelchair ramp have maximum slope of 1:12, and the ramp system may be configured so as to prohibit ramp slopes that do not comply with the ADA Accessibility Guidelines. In other words, some embodiments may incorporate slope-limiting features that add to the safety aspects of the ramp.

As noted above, the ramp system is modular in some embodiments which permit a ramp installer to determine and adjust the ramp dimensions and arrangement on-site during assembly. Likewise, in some embodiments, the ramp system is portable permitting easy transport either from a retail store to an installation location or between different locations where the ramp system may be needed.

Once the ramp frame is constructed, various types of decking material options may be positioned to complete the ramp floor. As noted above, dimensional lumber may be used in some embodiments. The use of dimensional lumber can advantageously alleviate the need for bulky, preformed ramp platforms and gives an installer the choice of using varied materials.

Side rails and/or handrails may also be installed in some embodiments. Certain embodiments of the ramps described herein may be used with standard, currently-available side and hand rails, particularly those that are ADA-compliant.

Certain embodiments of the invention provide a modular system for assembling a ramp, deck, or other raised structure that comprises: (a) a plurality of adjustable structures, each adjustable structure comprising: (i) first and second legs; (ii) a bar configured to span a width between the legs; (iii) a first adjustable member (e.g., a first adjustable sleeve) configured to cooperate with the first leg and a second adjustable member (e.g., a second adjustable sleeve) configured to cooperate with the second leg, wherein the first adjustable member (or sleeve) is adapted to connect with a first end of the bar and the second adjustable member (or sleeve) is adapted to connect with a second end of the bar in order to create a frame, wherein movement of the first and second adjustable members (or sleeves) with respect to the first and second legs causes relative movement of the bar to varying height positions. They also include first and second side rails connecting a first adjustable structure to a second adjustable structure, wherein the first side rail cooperates with the first adjustable member (or sleeve) on the first adjustable structure and the first adjustable member (or sleeve) on the second adjustable structure, and wherein the second side rail cooperates with the second adjustable member (or sleeve) on the first adjustable structure and the second adjustable member (or sleeve) on the second adjustable structure, such that movement of one of the adjustable members (or sleeves) relative to its corresponding leg adjusts the height of the side rail. In some embodiments, the modular system comprises a modular ramp system.

In another embodiment, the modular system provides a plurality of adjustable structures, each adjustable structure comprising: (i) first and second legs; (ii) a bar configured to span a width between the legs; (iii) adjustable members (e.g., adjustable sleeves), each of which is configured to cooperate with a respective one of the first and second legs, wherein the adjustable members (or sleeves) cooperate with respective ends of the bar; (b) first and second side rails configured to connect to a first adjustable structure separated a distance from a second adjustable structure, wherein the side rails span the distance between the first adjustable structure and the second adjustable structure, wherein the bar and the side rails cooperate with the adjustable members (or sleeves), such that movement of one of the adjustable members (or sleeves) relative to its corresponding leg adjusts the height of a corresponding end of the bar and of the side rail in cooperation with the adjustable member (or sleeve); and (c) a joist configured to be positioned between the first adjustable structure and the second adjustable structure and between the side rails, wherein the joist has two ends, and wherein a first end of the joist is positioned on the bar in the first adjustable structure and the second end of the joist is positioned on the bar in the second adjustable structure.

In other embodiments, a modular system for assembling a ramp, deck, or other raised structure comprises a plurality of adjustable structures, each adjustable structure comprising: (i) first and second legs; (ii) a bar configured to span a width between the legs; (iii) adjustable members (e.g., adjustable sleeves), each of which is configured to cooperate with a respective one of the first and second legs, wherein the adjustable members (or sleeves) cooperate with respective ends of the bar; (b) first and second side rails configured to connect to a first of the adjustable structures separated a distance from a second of the adjustable structures, wherein the side rails span the distance between the first adjustable structure and the second adjustable structure, wherein the bar and the side rails cooperate with the adjustable members (or sleeves), such that movement of one of the adjustable members (or sleeves) relative to its corresponding leg adjusts the height of a corresponding end of the bar and of the side rail in cooperation with the adjustable member (or sleeve); and (c) a joist configured to be positioned between the first adjustable structure and the second adjustable structure and between the side rails, wherein the joist has two ends, and wherein a first end of the joist is positioned on the bar in the first adjustable structure and the second end of the joist is positioned on the bar in the second adjustable structure.

Other embodiments relate to modular systems that comprise: (a) at least two adjustable structures, each adjustable structure comprising an H-frame with: (i) first and second legs; (ii) a bar configured to span a width between the legs; (iii) first and second adjustable members (e.g., adjustable sleeves) configured to cooperate respectively with the first and second legs and to support the bar; (b) at least one joist configured to be coupled to the bar of a first H-frame and to the bar of a second H-frame, wherein the joist has two ends with each end comprising a hook-like structure that limits the rotation of the joist relative to the bars.

In some embodiments, the systems may also have at least one extender insert configured to cooperate with at least one leg, wherein the height of the extender insert is adjustable relative to the leg; at least one post sleeve (or other item of post décor) configured to be positioned over and/or around each leg and extender insert; at least one post cap; and/or at least one threshold.

The adjustable members (or sleeves), in some embodiments, may each have (i) a coarse height adjustment structure configured to allow the position of the adjustable member (or sleeve) to move and be selectively locked in pre-specified increments with respect to its corresponding leg and (ii) a fine height adjustment structure configured to allow the position of the adjustable member (or sleeve) to move and be selectively locked in increments smaller than the coarse height adjustment structure relative to its corresponding leg. The coarse height adjustment structure may allow the adjustable member (or sleeve) to move and be selectively locked in pre-determined increments with respect to its corresponding leg. The adjustable members (or sleeves), in some embodiments, are independently adjustable relative to their corresponding legs such that one adjustable member (or sleeve) is at a height on its corresponding leg that is higher or lower than the height of the other adjustable member (or sleeve) on its corresponding leg. This is an example of one of the features that permit some embodiments of modular systems to be particularly well-suited for assembling structures on uneven terrain.

The various modular system components may be provided in sets or kits, with specific elements configured to be assembled in order to build ramps or decks of desired dimensions. For example, in a modular ramp system, the elements might be configured to build a ramp of a predetermined length. In a general sense, the modular ramp systems described herein comprise a ramp frame substructure, wherein the ramp frame substructure comprises series of a frame elements configured to receive a plurality of deck boards to form the ramp. As another example, a modular deck system may comprise a deck frame substructure, wherein the deck frame substructure comprises a series of a frame elements configured to receive a plurality of deck boards to form the deck.

In further embodiments, each side rail can comprise an internal ledge configured to support a decking material. In another embodiment, there are a plurality of deck boards coupled to the first and second side rails. In a more particular embodiment, the deck boards have a cross-sectional height of less than 4 inches and a cross-sectional width of less than 8 inches. In a further embodiment, the deck boards comprise wood, a composite material, or combinations thereof. The decking material may comprise individual lumber or composite board pieces that may be positioned lengthwise such that a first end of a piece of decking material rests on the internal ledge of the first side rail and a second end of a piece of decking material rests on the internal ledge of the second side rail.

A further embodiment relates to a ramp, deck, or other raised structure comprising handrails. The handrails may be traditional, conventional handrails. In some embodiments, modular systems further comprise an adjustable structure that comprises at least one extender insert in cooperation with at least one leg, wherein the height of the extender insert is adjustable relative to the leg. There may also be a post sleeve positioned over each leg and extender insert in some embodiments. If used, handrails may be coupled to post sleeves in some embodiments. If the adjustable member (or sleeve) provides a coarse and fine adjustment structure, the coarse adjustment structure, in some embodiments may comprise a movable pin that is received by one of a plurality of openings on the leg and is selectively movable into or out from each of the plurality of openings. The fine height adjustment structure may allow the adjustable member (or sleeve) to move relative to its corresponding leg and be locked in position in increments smaller than the coarse height adjustment structure, for example, height adjustments of less than one inch or anywhere along a continuum between each position that can be locked via a coarse adjustment.

The adjustable member can be implemented using non-sleeve configurations (e.g., a piston-like member that slides inside each leg and is accessible to external components via a longitudinal slot in each leg). For ease of reference, however, embodiments will be described hereinafter by reference to the exemplary sleeve configuration of the adjustable member, and it will be understood that non-sleeve implementations can serve as alternatives to the adjustable sleeves.

A joist may be positioned between at least two adjustable structures in some embodiments of modular structures, wherein the joist comprises two ends, wherein a first end of the joist is coupled to the bar on a first adjustable structure, and wherein a second end of the joist is coupled to the bar on a second adjustable structure. For example, the joist may comprise a hook-like structure comprising a substantially horizontal portion and two substantially vertical portions, wherein the distance between the two substantially vertical portions is greater than the width or diameter of the bar on the corresponding adjustable structure. The hook-like structure may limit the rotation of the ends of the joist relative to the adjustable structure bars in some embodiments. The hook-like structures may limit the slope of the joist. The joist may comprise a means for controlling a slope of the joist with respect to the adjustable structure, provided by elements other than a hook-like structure in some embodiments.

In some embodiments, each leg can be configured to be coupled with a foot structure that allows the leg to pivot multi-directionally relative to the foot structure. The foot structure may permit the leg to rotate and/or pivot multi-directionally a certain number of desired degrees relative to the foot structure.

In some embodiments, the adjustable structure bars can be length-adjustable (e.g., telescopically or otherwise) in order to allow the width of the adjustable structure to be adjusted and to allow the modular ramp system to accept variously-sized decking material. The side rails may also be length-adjustable in some embodiments. The ramps can also be provided with modified components configured to allow the modular ramp be designed with one or more turns.

Other embodiments relate to methods of assembling a ramp, deck, or other raised structure that comprise, for example: (a) erecting an adjustable frame substructure; (b) positioning a plurality of deck boards on the frame substructure, wherein the deck boards have a cross-sectional height of less than 4 inches and a cross-sectional width of less than 8 inches. In other embodiments, methods of assembling a ramp, deck, or other raised structure can comprise: (a) erecting an adjustable frame substructure, comprising (i) positioning a first set of two legs on a surface, (ii) sliding an adjustable member (e.g., an adjustable sleeve) on each leg and securing the adjustable member (or sleeve) at a desired height using a coarse height adjustment structure; (iii) positioning a bar to span a width between the two legs such that the bar cooperates with the adjustable members (or sleeves) to create a first frame; (iv) positioning a second set of two legs, adjustable member (or sleeves), and a bar to create a second frame a distance from the first frame; (v) positioning a set of two side rails to span the distance between the first frame and the second frame; (vi) positioning at least one joist between the first frame and the second frame, wherein the joist has two ends, wherein a first end of the joist is positioned on the bar in the first frame and the second end of the joist is positioned on the bar in the second frame; and (b) positioning a plurality of deck boards on the frame substructure.

The method may also include installing a threshold, installing a post sleeve over each leg, installing a hand rail, and/or installing post caps.

Certain aspects of the present invention will now be discussed in connection with the attached Figures which illustrate some embodiments of the present invention. Although the remainder of the description associated with the Figures will focus on embodiments related to ramps or wheelchair ramps in particular, it should be understood that only slight modifications need be made to the structure components in order to create any type of raised platform, deck, or patio structure.

Figure 2:
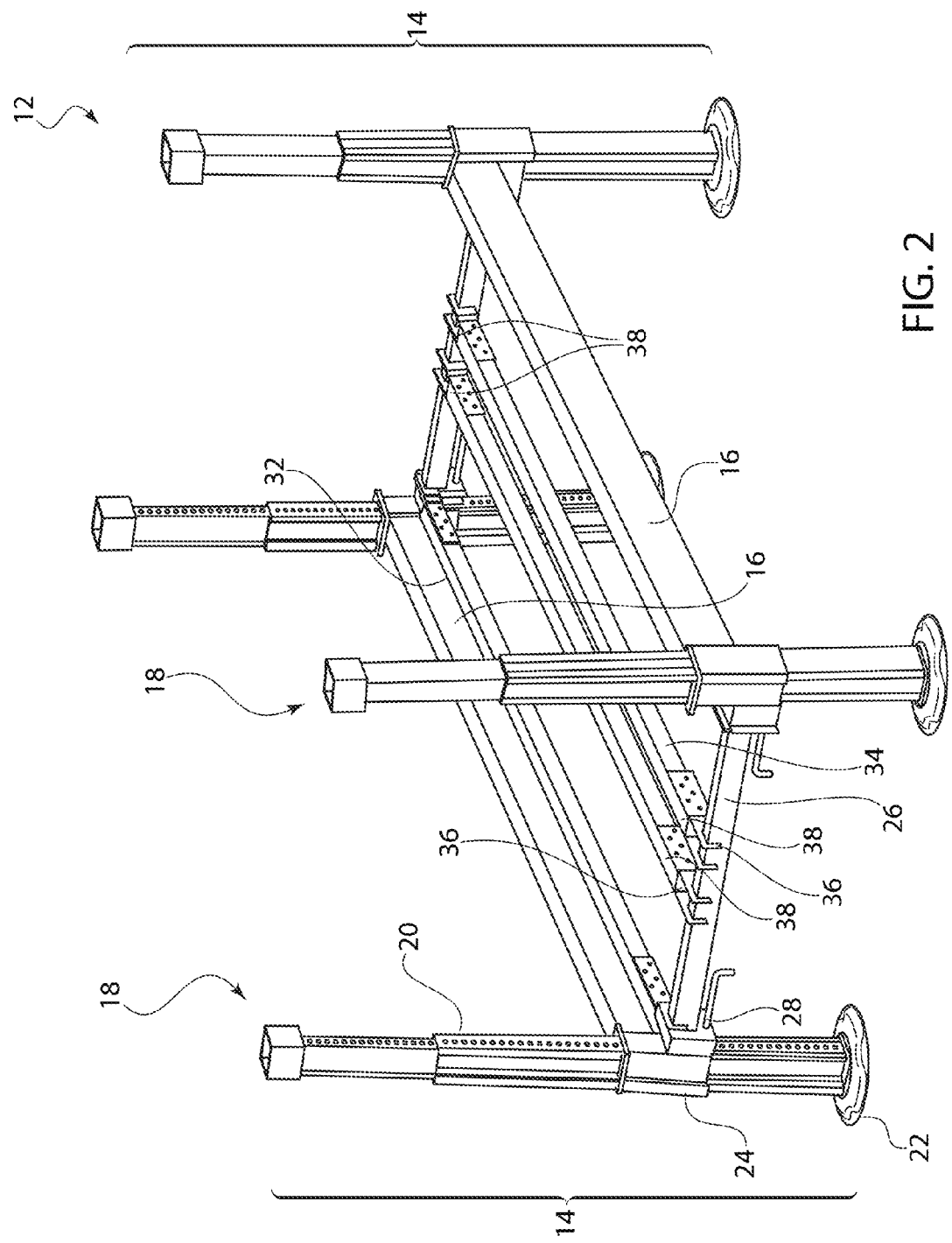
FIG. 2 shows a side perspective view of one embodiment of an adjustable structure in an assembled configuration.

Although each component will be described more fully herein, the general structure of one embodiment of a wheelchair ramp system comprises a series of adjustable structures 12 (or frame substructures) that are independently adjustable and secured to one another during the assembly process. The ramp designer and/or installer can determine how many segments are used and in what configuration depending on a number of factors including, without limitation, the height of the structure to be reached, the distance between the structure and a suitable starting location for the ramp, the topography of the land, and others. FIG. 1 shows one embodiment of a wheelchair ramp frame 10, prior to decking being applied to the frame substructure. The frame 10 is made up of a series of adjustable structures 12. FIG. 2 illustrates one embodiment of a single adjustable structure 12, prior to being secured or otherwise connected to other adjustable structures 12.

Figure 3:
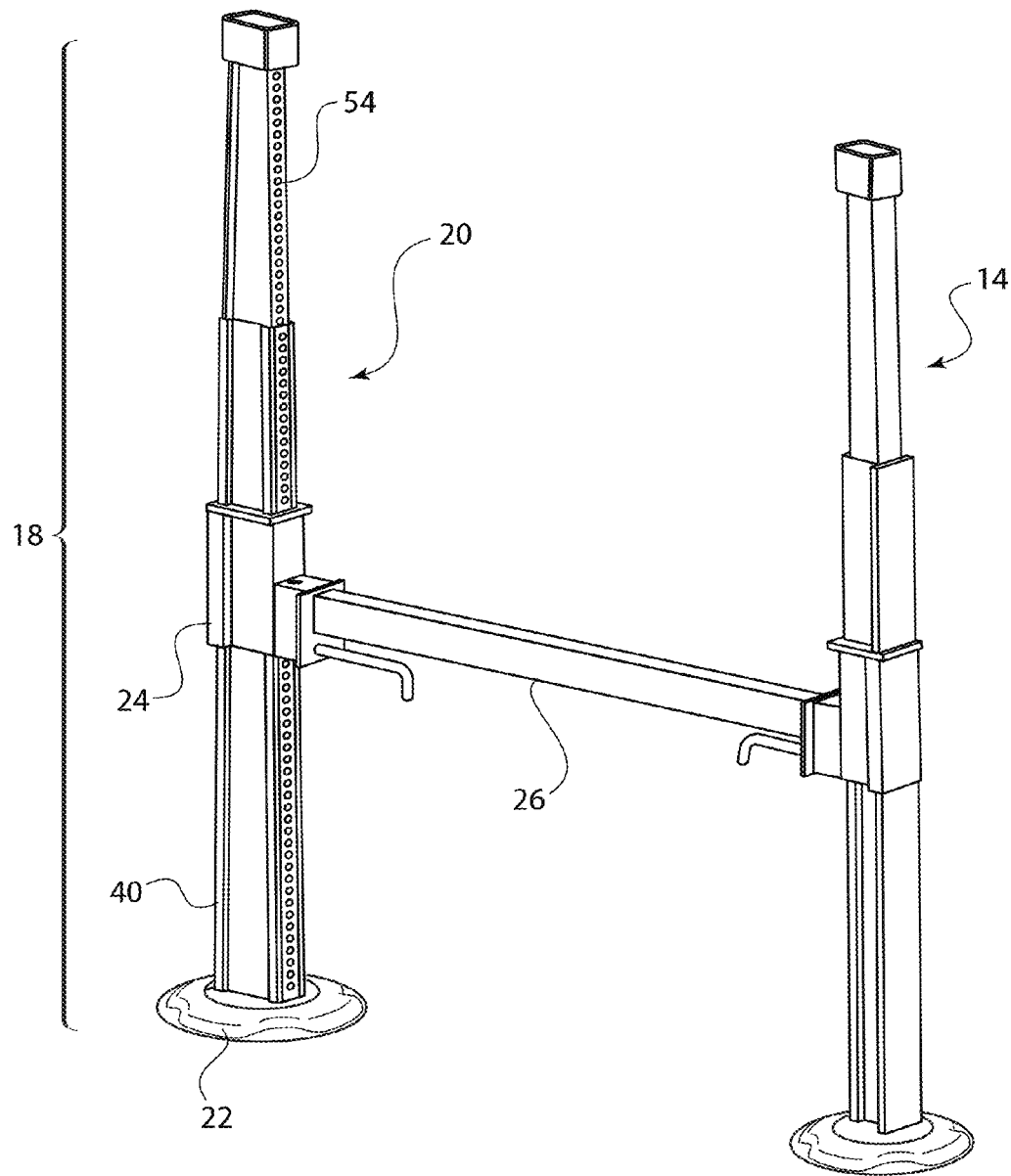
FIG. 3 shows a perspective view of one embodiment of an H-frame portion of an adjustable frame structure.
Figure 4:
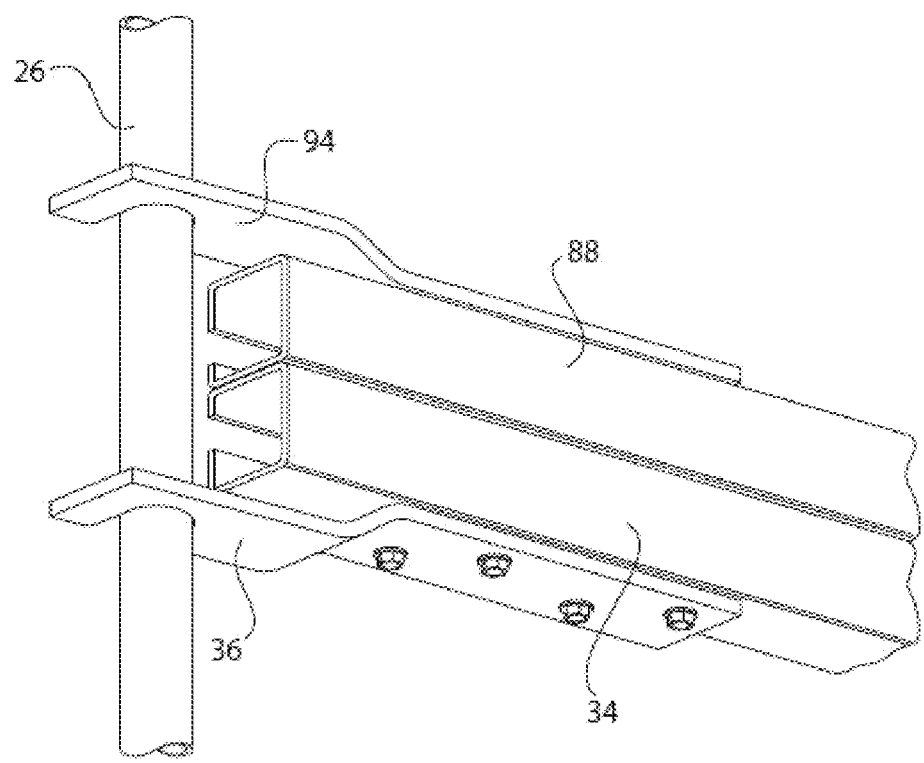
FIG. 4 shows a top view of one embodiment of a joist positioned with respect to an H-frame bar.

The adjustable structure 12 may include two H-frames 14 that are secured by side rails 16. The single H-frame 14 is shown in FIG. 3. Each H-frame 14 is made up of two upright leg components 18. Each upright leg component 18 is typically provided with an upright leg 20, a foot 22, and an adjustable sleeve 24. Two leg components 18 are joined by a bar 26 that is configured to span the width between the two leg components 18 and is secured in place by receiving portions 28 of the adjustable sleeve 24. The bars 26 are shown in FIGS. 2 and 3 as rectangular in cross-section but they may have any appropriate cross-section, such as tubular (or circular or round), square, oblong, triangular, or so forth. For example, FIG. 4 illustrates a bar 26 with a round cross-section. In embodiments where the slope of the ramp is to be limited, some cross-sections may more readily facilitate control of the slope than others.

Figure 12:
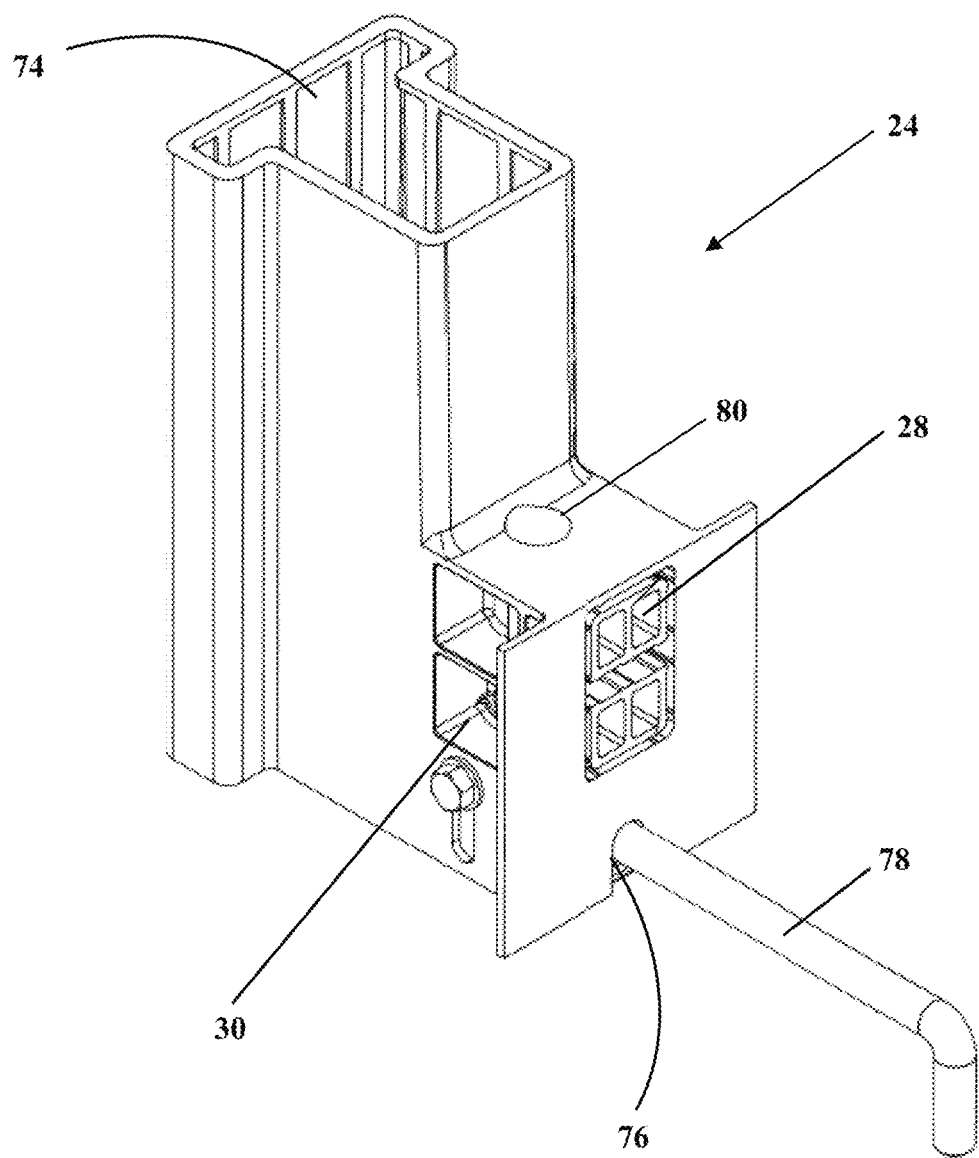
FIG. 12 shows a side perspective view of one embodiment of an adjustable sleeve.

In order to complete the adjustable structure 12, two side rails 16 are secured to the adjustable sleeve 24 at receiving portions 30 (an example of which is shown in FIG. 12). The securing of the side rails 16 to the adjustable sleeves 24 can be accomplished directly or indirectly. An example of indirect securing involves supporting the ends of the side rails 16 on the bar 26 adjacent to each adjustable sleeve 24 (e.g., using a hook, bracket or other mechanism—an example of which is described hereinafter with reference to FIG. 23). Each side rail 16 has an internal ledge 32 that is configured to receive and/or support decking material. One or more joists 34 are positioned in between the side rails 16 in order to provide interior support for the decking material. Each joist 34 has a connection feature 36 associated with each end 38. For example, the connection feature shown in FIGS. 2 and 4 are hooks 36 that are welded on or near each end 38 of the joist 34, or bolted or otherwise fastened thereto. In some embodiments, hooks 36 can be formed in the material used to form the joist 34. Hooks 36 are designed to engage the bar 26 of each H-frame 14. Although two joists are shown, it is envisioned that only one joist may be used embodiments, or in other embodiments, more than two joists may be used. The joists 34 are shown in FIG. 2 as rectangular in cross-section but they may have any appropriate cross-section, such as tubular (or circular or round), square, oblong, triangular, or so forth. In FIG. 4, a joist 34 having two hooks 36 extending from one end 38 is shown secured to a round bar 26.

The adjustable portion of one H-frame 14 segment is shown in FIG. 3. The H-frame is formed from a leg component 18, which comprises an upright leg 20, a foot 22, and an adjustable sleeve 24. One embodiment of a leg component 18 further comprises a lower leg segment 40, shown in FIG. 5, and an optional extender (which may be provided as leg extension 50, as shown in FIG. 6, or extender insert 54, as shown in FIGS. 3, 7A and 7B).

Figure 5:
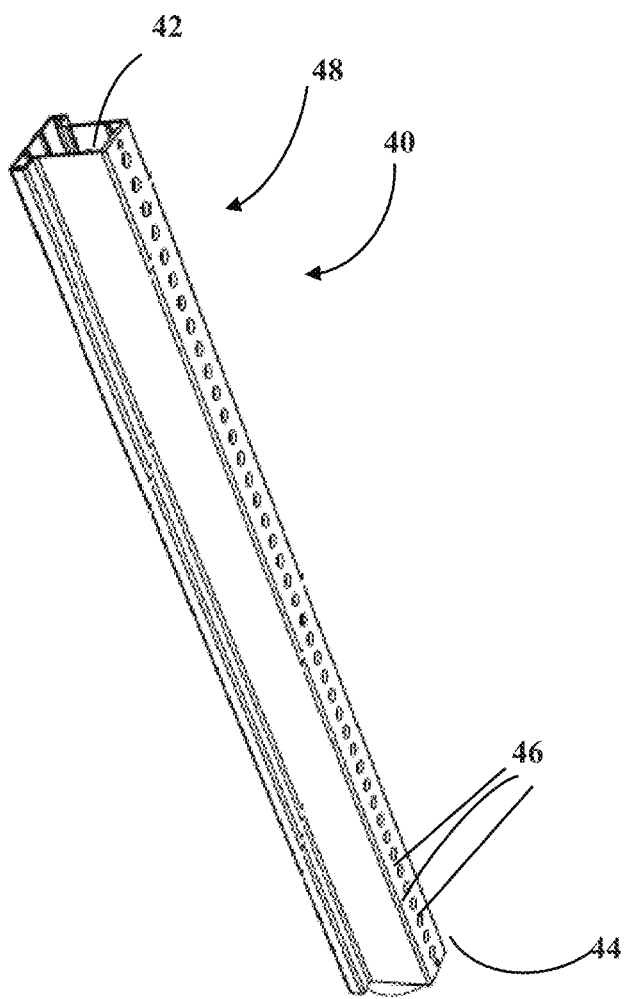
FIG. 5 shows a side perspective view of one embodiment of a lower leg segment of a leg.

In the specific embodiment shown of the lower leg segment 40 in FIG. 5, the lower leg segment 40 has a hollow, T-shaped-like cross section 42. A lower portion 44 of segment 40 cooperates with a foot 22 during use. Segment 40 is shown having a series of holes or openings 46 that extend up at least one side of the segment. In the embodiment shown, holes 46 extend along the bottom portion of the "T." These holes 46 are configured to receive pins for coarse adjustment of the sleeve 24 with respect to leg segment 40, the cooperation between which elements is described in more detail below. It should be understood that although holes 46 are shown extending the entirety of leg segment 40, holes 46 may only be positioned in certain portions of the leg segment 40 in some embodiments, although they are typically provided at least in the lower portion 44 and upper portion 48 of the leg segment 40.

It should also be understood that although an upper case "T"-shaped cross-section is shown in the embodiments in FIGS. 3 and 5-7, any number of other cross-sectional shapes may be used for the leg segment 40 and any extenders, such as an "x" shape, a "t" shape, a "c" shape, a "u" shape, a circular shape, or any other appropriate cross section shape that can allow multiple components to nest within one another as described further below. Even if the entire segment 40 is not provided as having a hollow cross-section, it may be desirable in some embodiments for an upper portion 48 of the segment to have a hollow area in order to receive a leg extender segment 50 and/or an extender insert 54, the additional portions that may comprise upright leg 20.

Figure 6:
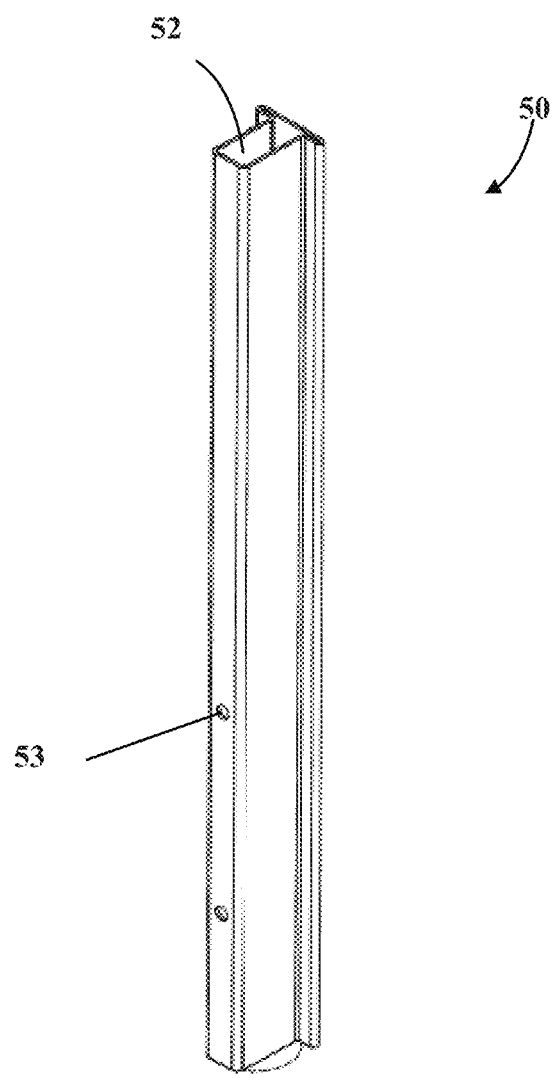
FIG. 6 shows a side perspective view of one embodiment of a leg extender.
Figure 7A:
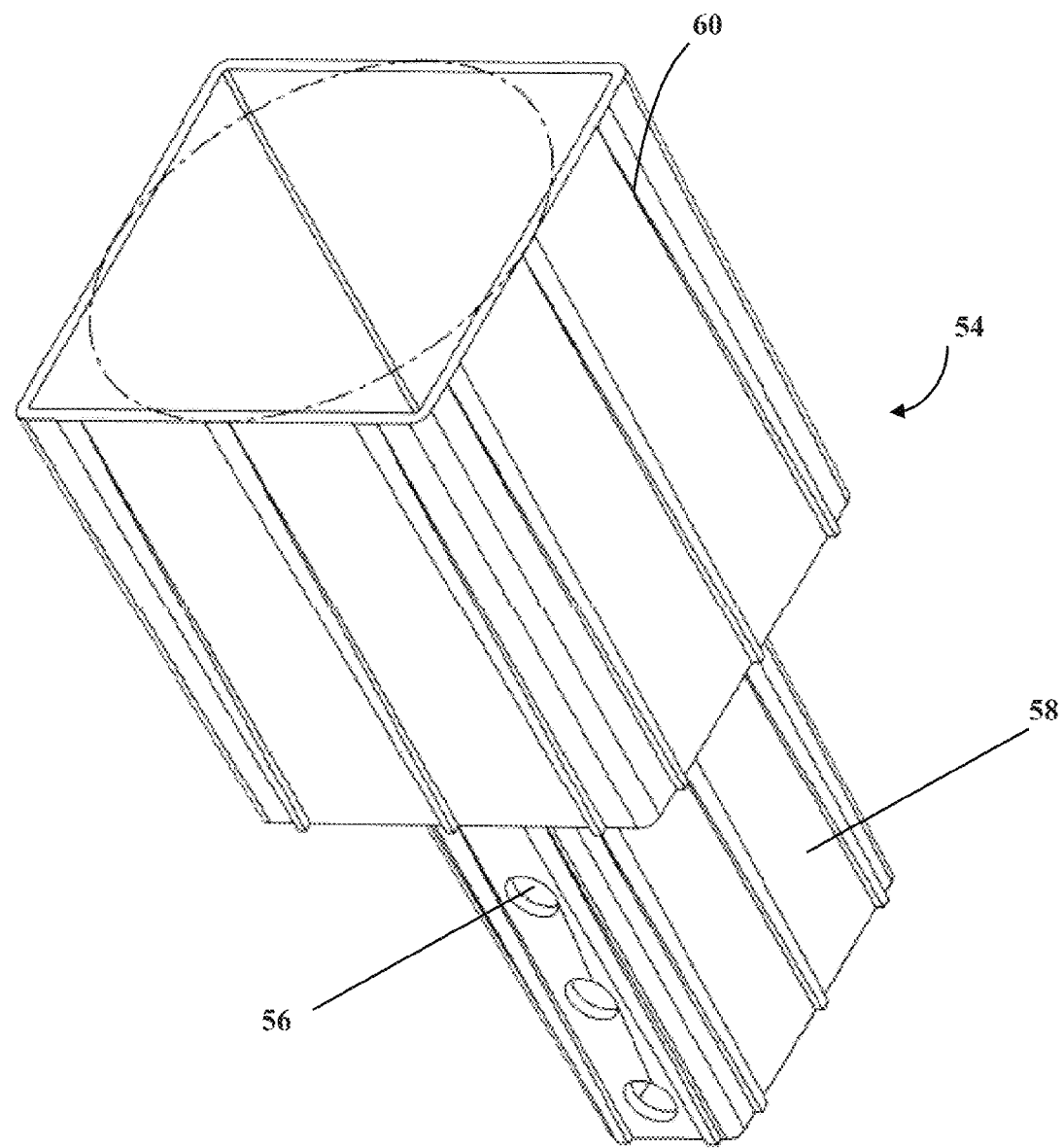
FIGS. 7A and 7B show side perspective views of alternate embodiments of one portion of a leg extender.
Figure 7B:
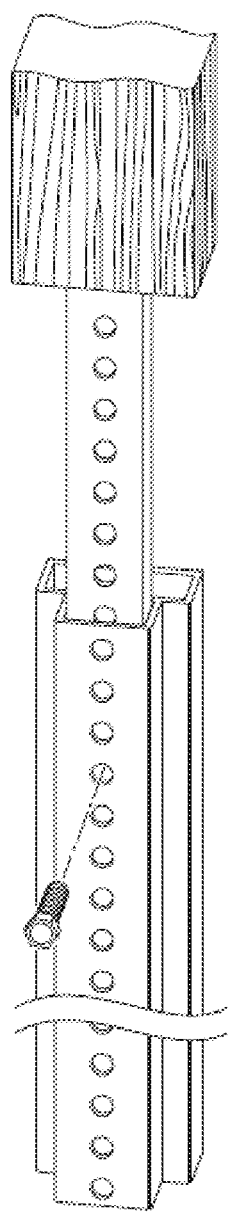

As shown in FIG. 6, one embodiment of leg extender segment 50 is configured with a hollow, T-shaped cross-section 52, which allows leg extender 50 to be received by both the adjustable sleeve 24 (described in more detail below) as well as the lower leg segment 40. The T-shaped cross-section is slightly smaller than the T-shaped cross-section of the lower leg segment 40, particularly at the upper cross of the "T." Leg extender segment 50 is optional, and may be used if a leg segment needs to be taller, due to the terrain on which the ramp is being constructed and/or the height of the structure to be reached by the ramp system. The leg extender segment 50 has one or more holes 53 that allow a pin (or, for example, a fastener) to secure the leg extender 50 to lower leg segment 40.

An alternate embodiment of an extender is shown in FIGS. 7A and 7B as an extender insert 54. This extender insert 54 either may be positioned over the leg extender 50, or may be positioned directly in the leg segment 40 if an extender 50 is not necessary. It is generally expected that two extenders 50, 54 are not necessary, and extender insert 54 has additional features that may lend it to being a more desirable extender option (over extender 50) in some embodiments. Extender insert 54 has a series of holes 56 that are configured to receive a pin (or, for example a fastener) in order to lock the extender insert in place 54 after it has been adjusted to the desired height. In other words, the height of the extender insert 54 is adjustable relative to the upright leg 20. One benefit of extender insert 54 is that it can be used to lengthen the lower leg segment 40 and to provide a clean, finished look to the upright leg 20. It also spares the installer from expending the time and effort he or she otherwise might have spent if he or she needed to saw off a leg post in order to provide legs of the same height. Being able to adjust insert 54 so that it telescopes further into leg segment 40 or further out of leg segment 40 assists in assembly of such ramps. The installer can simply adjust the height of each post with the extender insert 54 to make it higher or lower as desired, and then secure the insert 54 in place with respect to leg segment 40 with a pin (or, for example, a fastener).

The extender insert 54 shown in FIGS. 7A and 7B has a leg cooperating portion 58 that is sized and shaped to cooperate with the lower leg segment 40 (or the leg extension 50, if used). In the embodiment shown, leg cooperating portion 58 is somewhat rectangular in cross-section, such that it may fit into and telescope against upper portion of leg 40 (or into leg extender 50). Extender insert 54 may also have a top portion 60 that is shaped with a wider cross-section to provide a finished look to the top of a post. In the embodiment shown, top portion 60 is square-shaped, so that it resembles the upper end of a conventional post.

Figure 8A:
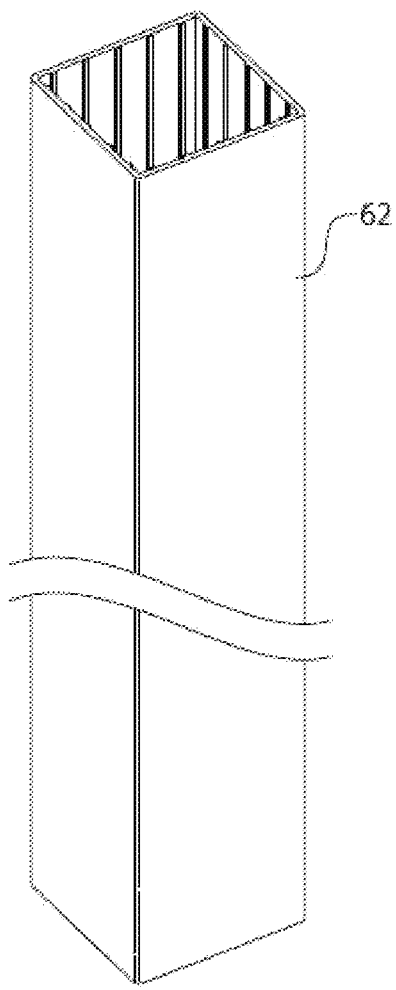
FIGS. 8A and 8B show side perspective views of one embodiment of a post cover.
Figure 8B:
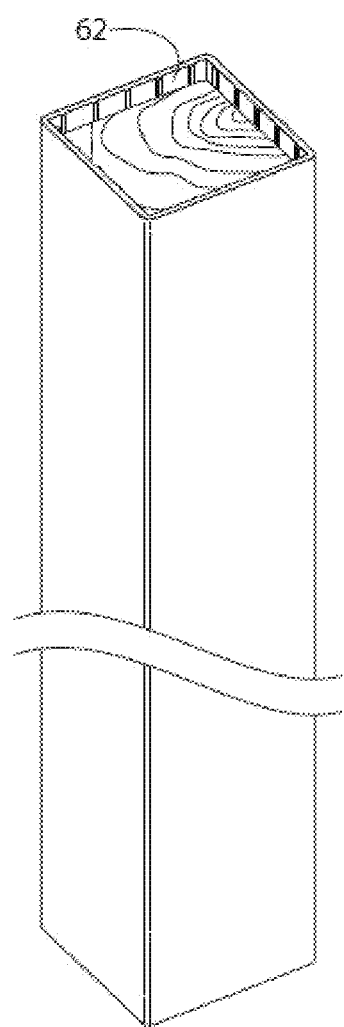

As shown in FIGS. 8A and 8B, top portion 60 may also provide support and/or stabilization for a post cover 62 that is configured to slide over the upright leg 20. In some embodiments, top portion 60 can also be used to secure ends of a handrail (which, for example, might connect with balusters). A decorative end cap or post cap cover 122 may fit over top portion 60, as shown in the completed ramp assembly of FIG. 20. It should be understood that top portion 60 may be any appropriate material; although shown as a wood portion in FIG. 7B, it may be any other acceptable material, such as vinyl, polyethylene, molded plastic, or a composite material.

Figure 20:
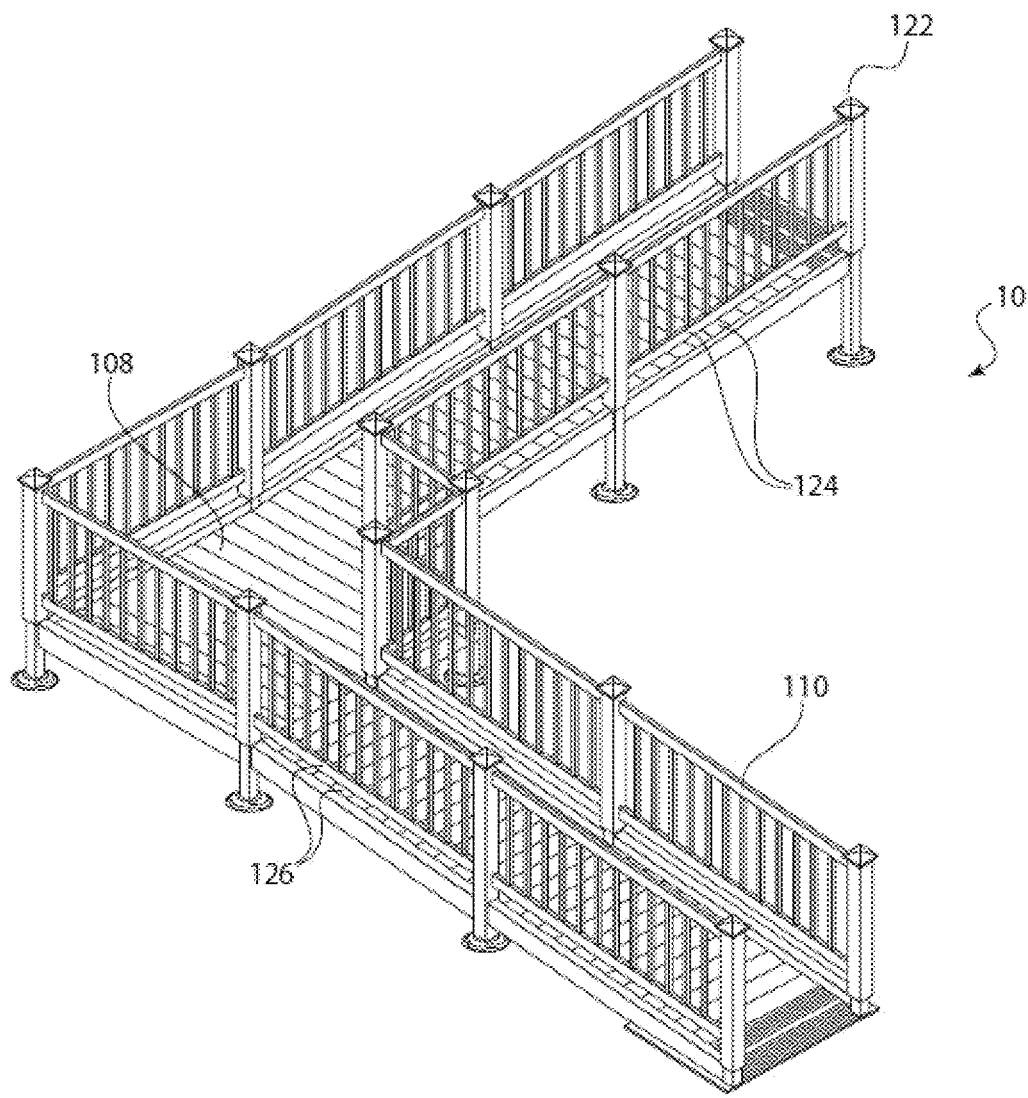
FIG. 20 shows a side perspective view of a wheelchair ramp in its assembled configuration.

It is also expected that in certain embodiments, the installer will complete the upright leg with a post cover 62, an example of which is shown in FIGS. 8A and 8B. Post cover 62 is generally provided as a hollow tube having a cross-section that corresponds to upright leg 20 so that cover 62 may slide over the leg and cover the joint lines between segment 40 and any extender used (whether extender 50, insert 54, or both). It may be PVC or fiberglass or any other appropriate material desired to provide a finished look to the ramp. As described in more detail below, there may be handrails and/or footrails that can be secured or otherwise coupled to the post covers 62. A decorative end cap or post cap cover 122 may fit over the post cover 62 to provide a clean, finished appearance to the assembled ramp 10, as shown in FIG. 20.

Figure 9:
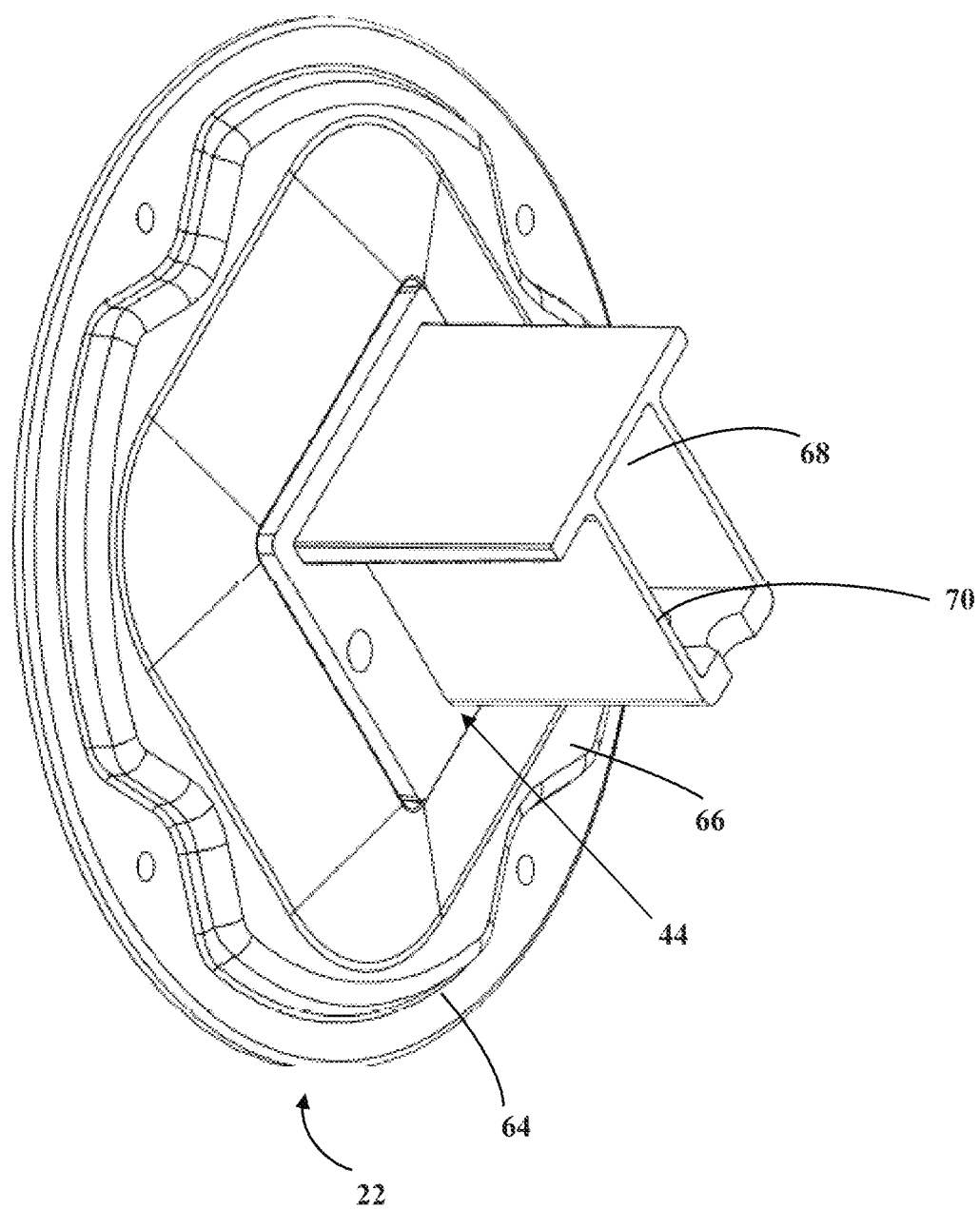
FIG. 9 shows a side perspective view of one embodiment of a foot structure.

In use, the upright leg 20 is secured in place by a foot 22. One embodiment of a foot 22 is illustrated in the views shown in FIGS. 9 and 10. In this embodiment, foot 22 has a base 64 from which a leg support 66 extends. Leg support 66 is shaped to allow lower portion 44 of lower leg segment 40 to be positioned within leg support 66. For example, leg support 66 may accommodate a T-shaped cross-section 68 of lower leg segment 40 (only a portion of which is shown in FIG. 9) or a rectangular lower portion 44 thereof, such that the lower portion 44 of lower leg segment 40 fits on and/or within leg support 66. (However, it should be understood that leg support 66 may be narrower than leg 40 such that the leg 40 fits over the support 66 in other embodiments.)

Figure 10:
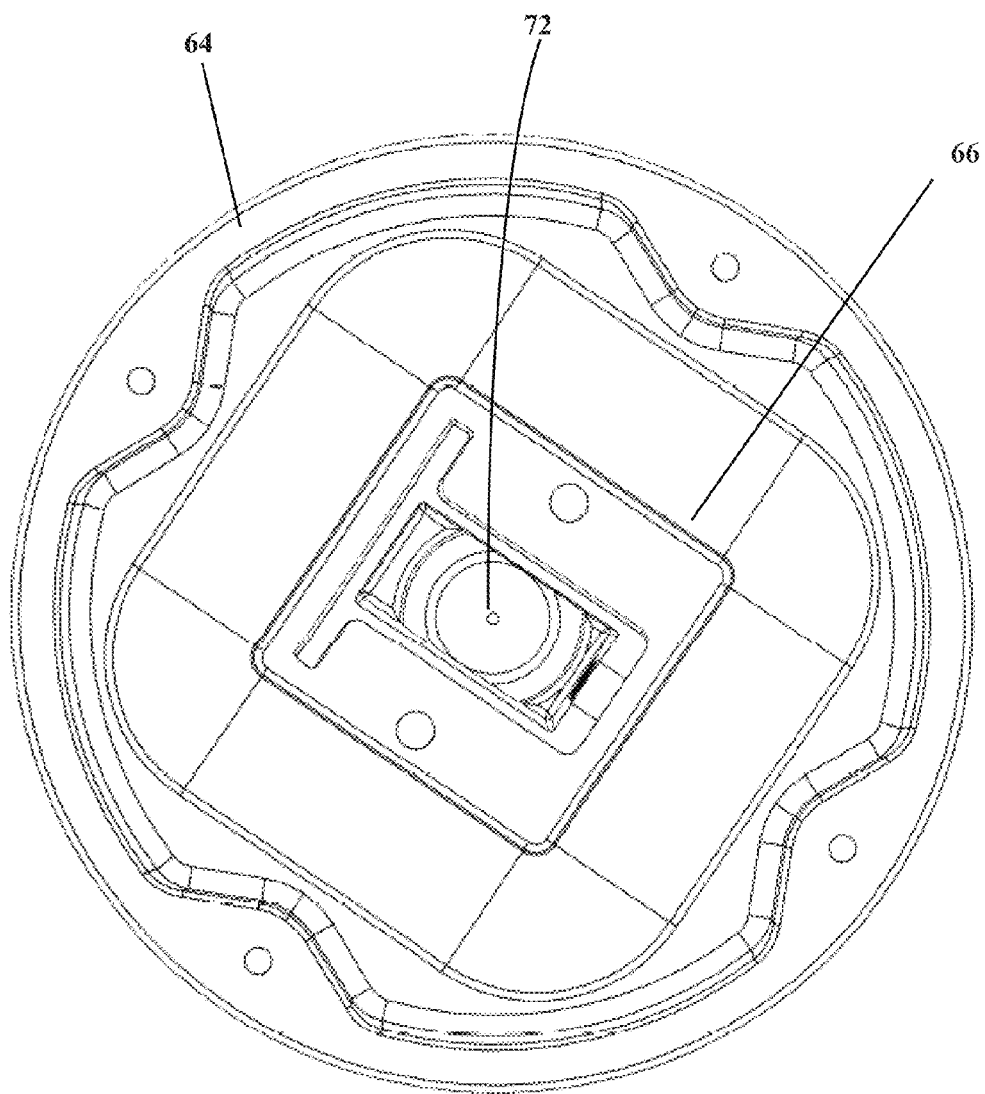
FIG. 10 shows a top plan view of the foot structure of FIG. 9.
Figure 11:
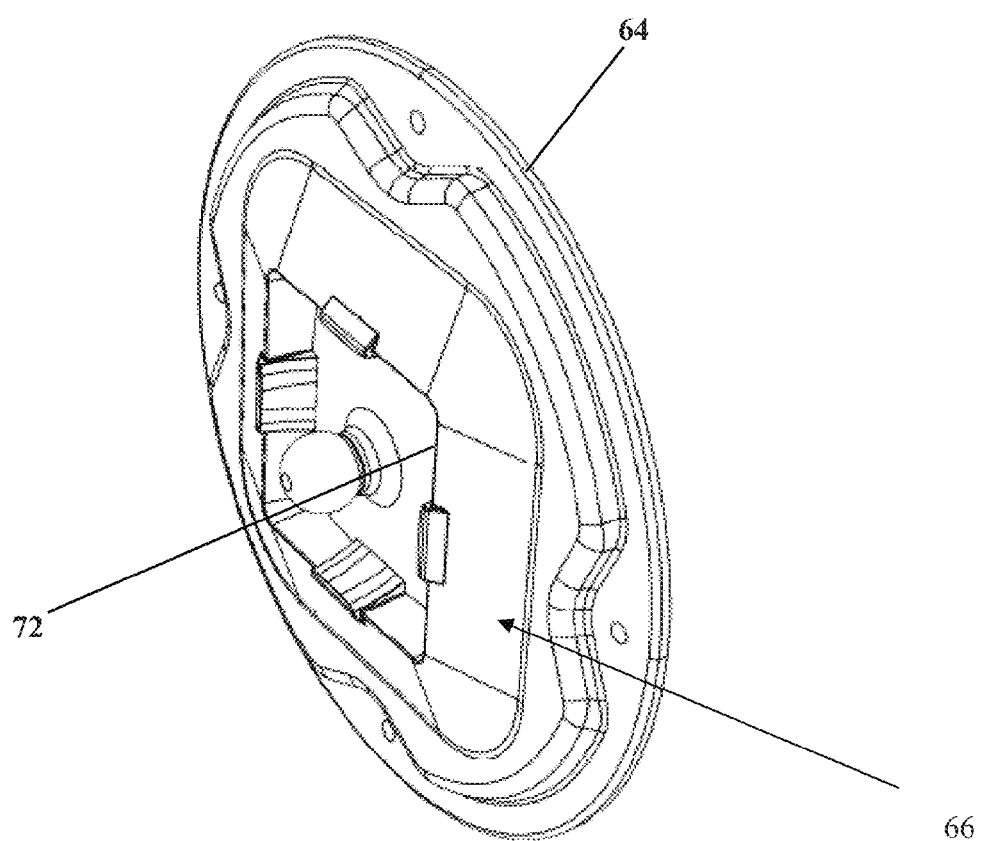
FIG. 11 shows a side perspective view of the foot structure of FIG. 9 with the leg support removed to show the internal ball.

As shown in the top view of FIG. 10 and in the side perspective view of the foot 22 of FIG. 11 (which has the lower leg segment 40 removed for ease of viewing), the base 64 may have an internal ball 72 or leg rotation/pivot arrangement against which an upright leg 20 (or lower leg segment 40) may fit. This can allow the upright leg 20 to remain vertical and substantially parallel with respect to the other legs, even if the foot 22 is positioned on (and coplanar with) an inclined surface and regardless of the direction of the incline. For example, rather than requiring the leg to extend up from the foot at a strict 90° angle (e.g., as would otherwise be dictated by the square leg insertion portion of the foot), the internal ball 72 allows the leg to extend at an angle with respect to the foot 22, so that the leg 20 may be substantially vertical and align with the remaining legs. In one embodiment, the internal ball 72 permits the upright leg to rotate and/or multi-directionally pivot +/−10 degrees relative to the foot structure 22. While other angles could be used, the angle may be limited in some embodiments to prevent installation of the ramp system on surfaces that are too steep. In some embodiments, the limits on multi-directional pivoting can be achieved by configuring the bottom of the upright leg 20 so that it mechanically interferes with one or more surface portions of the foot 22 when the predetermined angular limit is reached.

Once the lower leg segment 40 has been secured with respect to the foot 22, the adjustable sleeve 24 may be positioned over the leg. As shown in FIG. 12, the adjustable sleeve 24 has a T-shaped cross-section 74, such that it may slide over the lower leg segment 40 and any extenders 50, 54 that may be used. (Again, although a T-shaped cross section is shown and described, other cross sectional shapes may be used.) The sleeve also has receiving portions 28, 30. These portions are designed to receive and/or accommodate a bar 26 and a side rail 16, described in more detail below. The connection between the leg, the sleeve, the bar and the side rail allows movement of the sleeve to cause movement of the ramp height, such that adjustment of the sleeve 24 causes adjustment of the ramp.

A pin hole 76 is provided to receive a movable pin 78 in order to secure the sleeve 24 to the upright leg 20 at the desired height. This is a coarse height adjustment structure. It allows the sleeve 24 to move with respect to its corresponding leg 20 and to be selectively locked in place in pre-determined increments, in this instance, defined by holes 46 in the leg segment 40. The holes 46 on leg segment 40 that receive the pin 78 are typically spaced about one inch or less apart, although other spacing options can be used. The ramp installer may pull the pin 78 in or out of the opening 76 in order to slide the sleeve 24 up or down along increments on the upright leg 20. The pin 78 can be configured to be entirely removable from the opening 76, or alternatively, its range of movement can be limited so that pulling of the pin 78 only results in the pin coming out of an opening 46 of the leg 20 but it remains in the opening 76 while the adjustable sleeve 24 is moved up or down during a coarse adjustment. The latter configuration (i.e., a limited removal of the pin 78) helps avoid misplacement of the pin 78 during a coarse adjustment. Once the desired height is reached (at least generally), the pin 78 is then inserted into an opening 46 on the upright leg 20 to secure the sleeve 24 in place.

Adjustable sleeve 24 also has a fine height adjustment structure that can be used to make fine adjustments once the coarse height adjustment has been made. In one embodiment, the fine height adjustment structure comprises an opening 80 in the sleeve 24 that can receive an instrument (such as a screwdriver) in order to adjust an internal screw. Internal screw moves the sleeve 24 up and down along the leg 20 within a range that is less than the coarse height adjustment increments. For example, a screwdriver or other tool may be positioned in the fine height adjustment opening 80 in order to make smaller adjustments so that the ramp can be precisely leveled. An example of this adjustment taking place is shown in FIG. 13.

Figure 13:
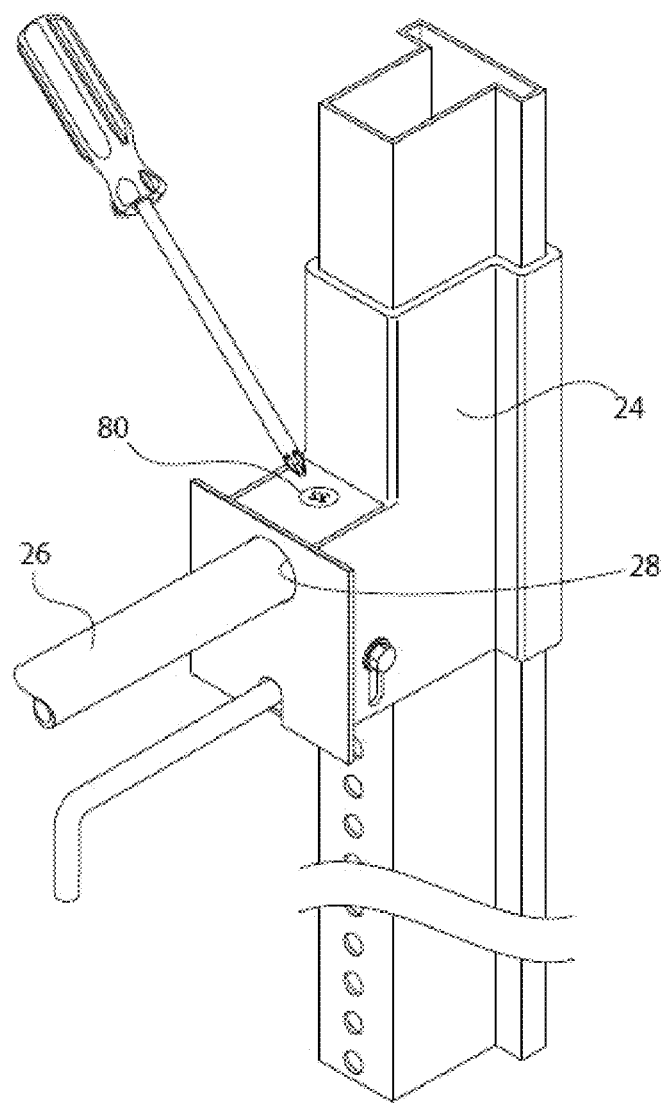
FIG. 13 shows a top perspective view of an adjustable sleeve in place on a leg, having its height adjusted.

FIG. 13 also shows a bar 26 that has been positioned in receiving portion 28. (Note that receiving portions 28, 30 are shaped to receive or otherwise accommodate the size and shape of bar and side rails. If bar 26 has a circular cross-sectional shape, such as that shown in FIG. 13, then the receiving portion 28 will have a corresponding circular shape. The receiving portion 28 in FIG. 12 is designed to receive a rectangular cross-section bar.) Once the bar 26 has been positioned and the remaining leg components (50 and/or 54) are secured with respect to lower leg segment 40, the H-frame 14 of FIG. 3 is complete. Movement of the sleeves 24 on the corresponding legs 20 causes movement of the bar 26, which helps determine and control the ultimate height and/or incline angle of the ramp (by causing corresponding movement of the joists, which are described in more detail below.)

In one embodiment, the bars 26 may be provided so that they can be adjusted in order to vary the width of the ramp. For example, the bar 26 may be a telescoping bar, a bar that has various settings defined by a ball and detent assembly, or so forth. Bar 26 can be designed so that the width of the ramp can be varied as desired. In some embodiments, the bar 26 may have a fixed width, but be available in different sizes, such as a 36" bar, a 48" bar, or other options. This allows a user to define what size deck boards are to be used and to customize the ramp for the desired space and/or use.

Figure 14:
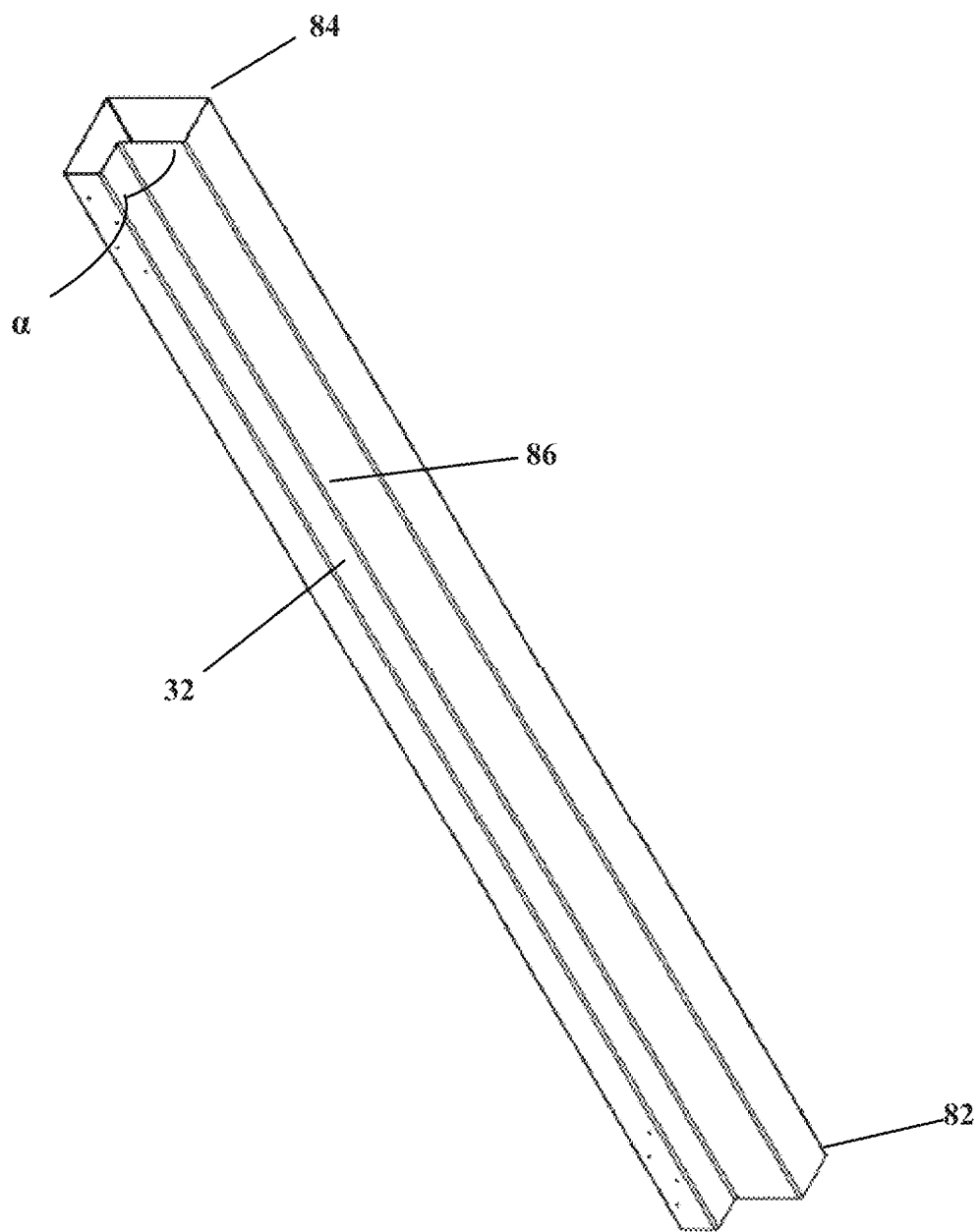
FIG. 14 shows a side perspective view of one embodiment of a side rail.

In order to attach or otherwise secure two H-frames 14 together and create a structure as shown in FIG. 2, side rails 16 and one or more joists 34 are positioned so as to span the distance between the two H-frames 14. One embodiment of a side rail 16 is shown in FIG. 14. Side rail 16 has first and second ends 82, 84 which, in use, are received and/or supported at receiving portions 30 of the adjustable sleeve 24. Side rail 16 also has an internal ledge 32 which is positioned generally at an angle α to side wall 86 such that they form an "L"-shape in the embodiment shown. Angle α may be a ninety degree angle, or it may be greater or less than ninety degrees in other embodiments. Internal ledge 32 and side wall 86 may be the same length, or internal ledge may be slightly shorter than the side wall 86 (as shown in FIG. 14) or vice versa. The primary purpose of the side rail 16 is to create a resting area for deck boards such that they may be positioned against and secured to internal ledge 32, while side wall 86 is still slightly raised above the deck board (once positioned) so that it creates a slight lip. The slight lip can create a "cane rail" in some embodiments in accordance with ADA regulations.

In one embodiment, the side rails 16 may be provided so that they can be adjusted in order to vary the length of each ramp segment. For example, the side rails 16 may be telescoping rails, rails that have various settings defined by a ball and detent assembly, or so forth. Rails can be designed so that the length of the ramp segment can be varied as desired. Instead, side rails may be provided in varying or varied fixed sizes, such as 60 inches, 100 inches, or other options. Fixed length side rails may be more desirable in some embodiments. This allows the user to define how many ramp segments should be installed in order to customize the ramp for the desired space and/or use. In some embodiments, the side rails 16 can have a length greater than 60 inches. The side rails, in some embodiments, can have a length of less than 100 inches. In some embodiments, the side rails can have a length between about 60 and about 80 inches.

Figure 15:
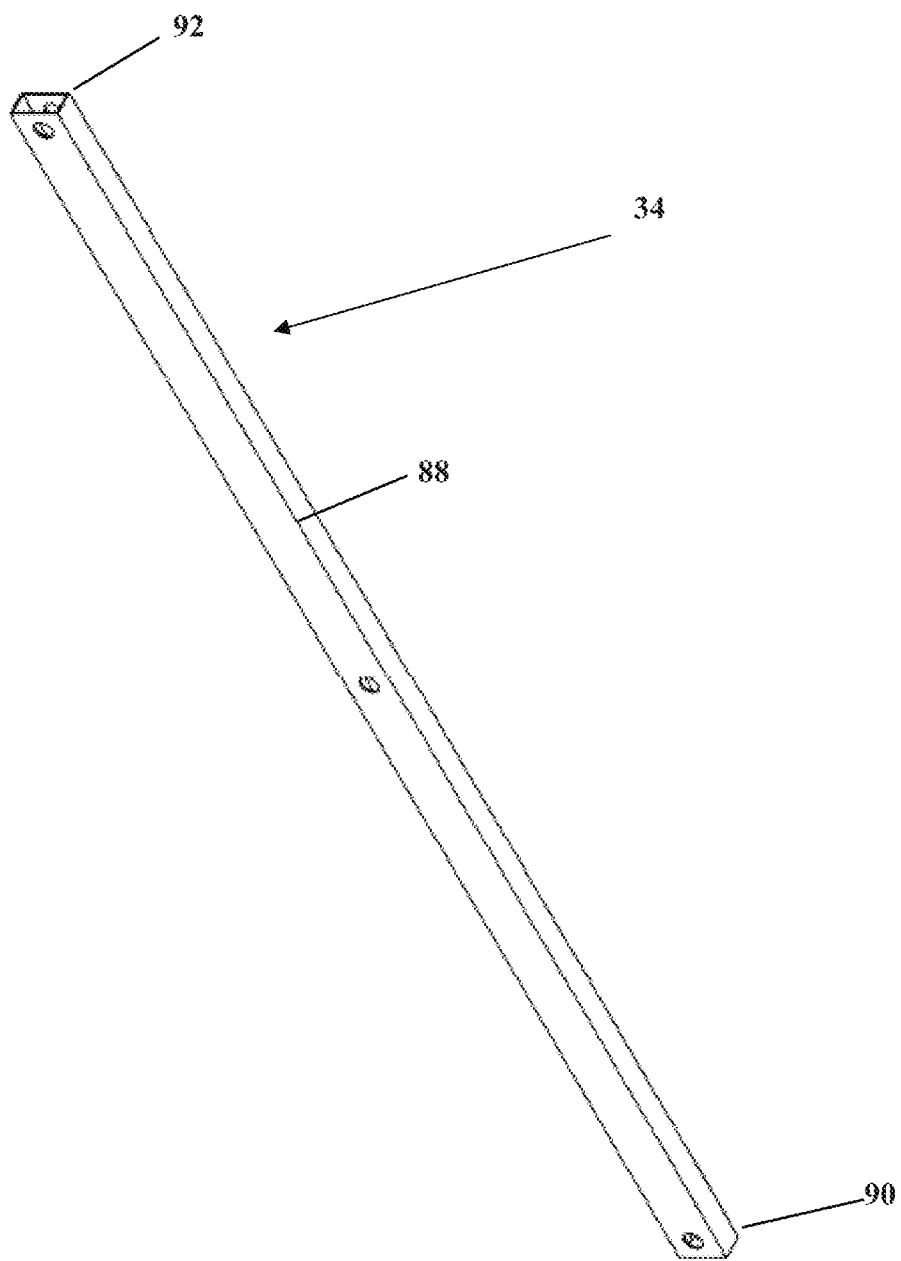
FIG. 15 shows a side perspective view of one embodiment of a joist.

Once the bars 26 and adjustable sleeves 24 are secured to the upright legs 20 and adjusted to the appropriate levels, and once two side rails 16 have been positioned between two H-frames 14, one or more joists 34 may then be positioned on the bars, as shown in FIG. 2. Joists provide a bracing function, as well as provide an incline limiting feature. FIG. 15 illustrates an elongated section 88 (for use as the main body of joist 34) with ends 90, 92. Each end 90, 92 is configured to receive a structure 94 that is designed to both secure the joist 34 to the bar 26, as well as limit an inclination of the joist that is too high or otherwise outside of safety and ADA standards.

Figure 16:
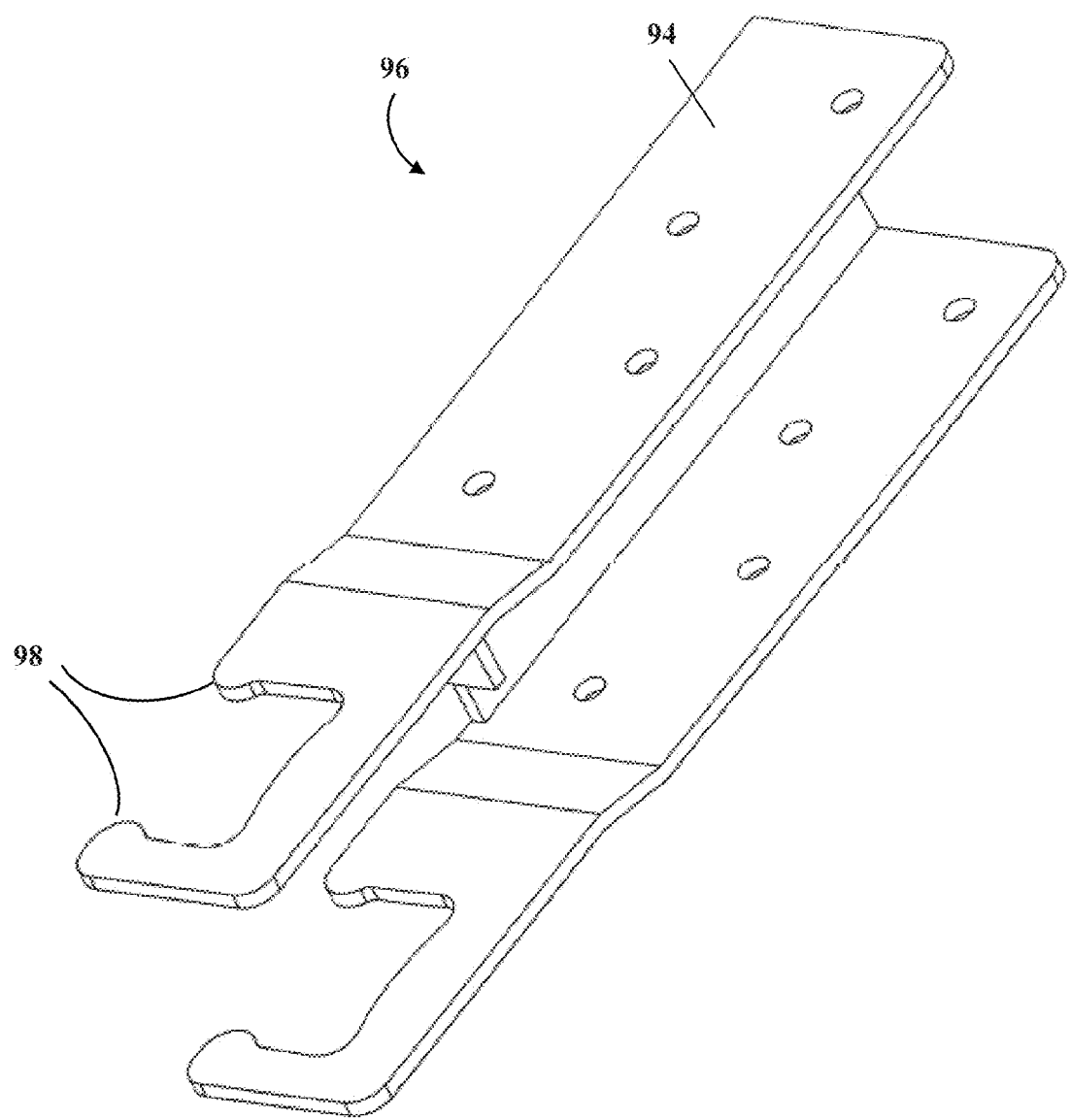
FIG. 16 shows a side perspective view of one embodiment of a hook for use in connection with the joist of FIG. 15.

FIG. 16 shows one embodiment of a structure 94 in the form of a double hook 96. Examples of assembled joists 34 are shown in FIGS. 2 and 4. (Although a double hook is shown in these figures, it should be understood that a single hook or multi-hook may be used in some embodiments.) Hook 96 is designed to be secured to the elongated section 88 of the joist 34, and each hook secures the joist 34 to a bar 26 that has been positioned to complete an H-frame 14. Although the section 88 and hook 96 are shown as separate elements, it should be understood that they may be integrally formed, if desired. Hook 96 may have inner fingers 98 that are used to limit the rotation of the ends of the joist 34 relative to the bars 26. This feature can limit or control the slope of the joist 34 (and likewise the ramp), and prevents an installer from creating a slope that is too high or otherwise outside safe and recommended ranges. The hooks may limit the slope of the joist to no greater than 1:12 relative to horizontal in some embodiments (i.e., a change of no great than one unit in height for each 12 units in horizontal distance). The hook 96 is configured to interfere with the bar 26 and prevent further rotation if an attempt is made to install the ramp at an angle that is too steep. Other embodiments might include alternative and/or additional structures which limit the slope of the ramps, for example, by limiting the rotation of the joists 34 and/or side rails 16 through mechanical interference or otherwise. One embodiment, for example, can be configured to result in interference between an adjustable sleeve 24 and one or more corners of the side rails 16 when the limit on slope is reached. Such interference can be designed to prevent nesting of the hooks 96 and/or rail brackets 142 (shown in FIG. 23) on the bar 26 when the slope exceeds the predetermined limit.

Although the slope limit of 1:12 can be implemented for compliance with ADA requirements and/or guidelines, it is understood that other embodiments can utilize other slope limits based on obtainable variances to the requirements and/or guidelines and/or if the relevant jurisdiction or intended uses provide different options for slope. Some embodiments, for example, might be configured to achieve a particular slope limit between 1:7 and 1:14, such as 1:8 or 1:10.

Some embodiments can be configured with rail 16 lengths that are compatible with standard pre-fabricated handrail and baluster combinations (e.g., approximately 72 inches in length) and/or with a hole 46 spacing that achieves a coarse adjustment of approximately one inch per hole 46 along each leg 40. Such embodiments can be configured to achieve the following correlation between: (1) approximate ramp angles (with respect to the horizontal) and (2) differences in relative height (in number of holes) of the adjustable sleeves 24 across two consecutive H-frames: 3-hole difference yields a ramp angle of approximately 2.85 degrees (approximate slope of 1:08); 4-hole difference yields a ramp angle of approximately 3.8 degrees (approximate slope of 1:10) 5-hole difference yields a ramp angle of approximately 4¾ degrees (approximate slope of 1:12); and a 9-hole difference yields a ramp angle of approximately 8.55 degrees.

Figure 23:
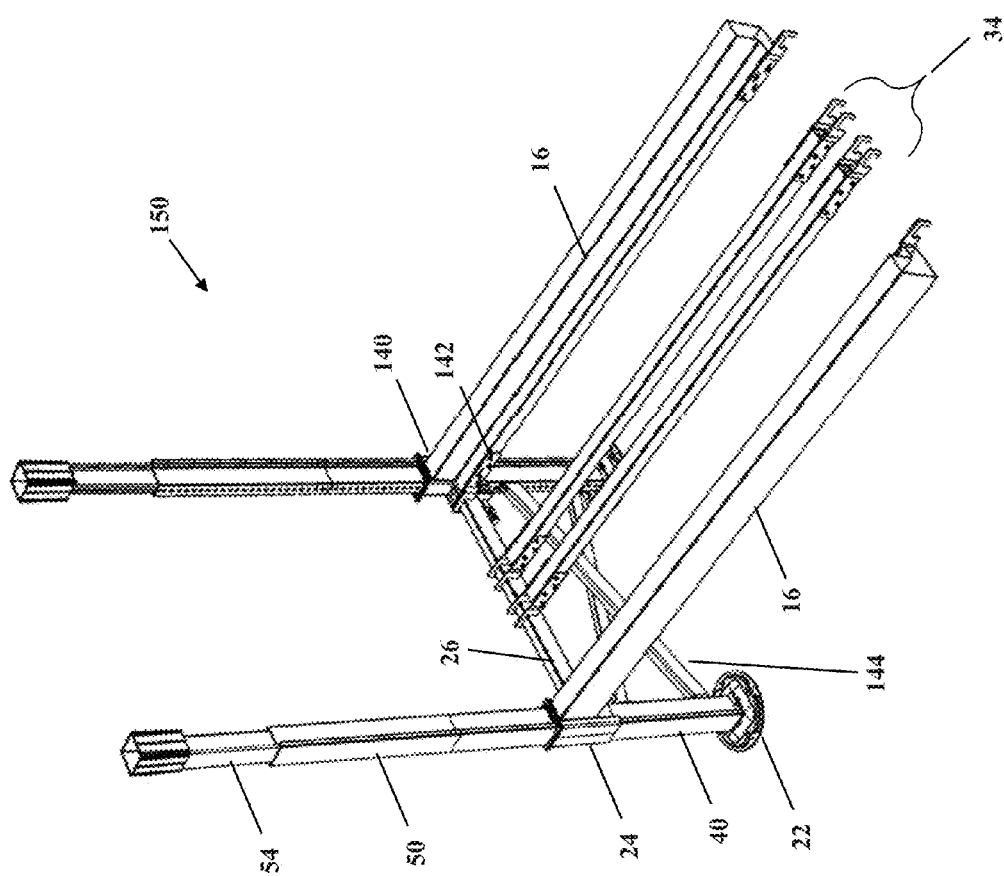
FIG. 23 shows a side perspective view of the components that may be used to build a middle ramp section.

FIG. 2 illustrates two joists 34 positioned between two H-frames 14. Once the assembly of FIG. 2 has been erected, further adjustable structures 12 may be assembled and connected to extend the length of the ramp. An example of multiple adjustable structures 12 in place is illustrated in FIG. 1. An example of a middle ramp section 150 that may be provided in the form of a kit is shown in FIG. 23. In this figure, the components shown may be erected and positioned end-to-end until the desired ramp length has been achieved.

Figure 17:
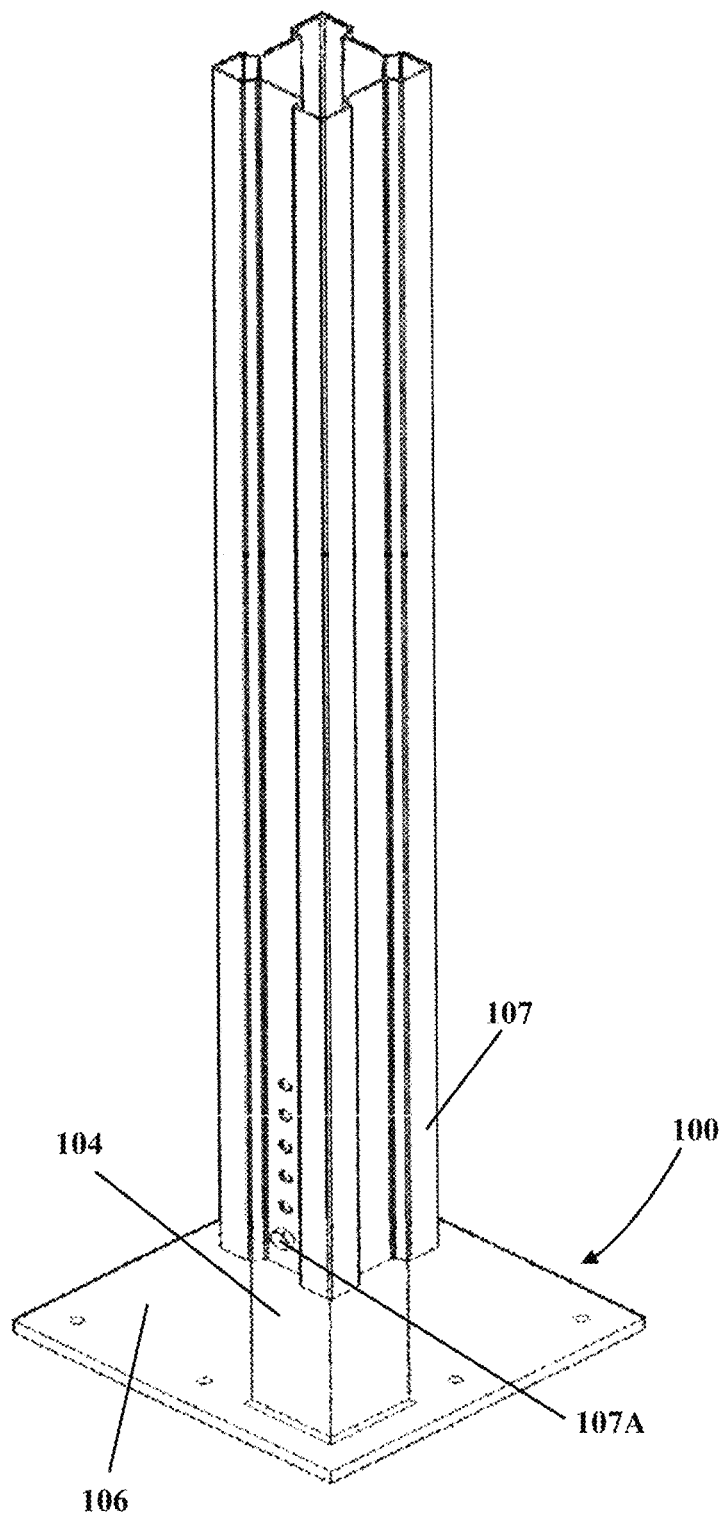
FIG. 17 shows a side perspective view of one embodiment of a leg segment used to form a threshold base landing.
Figure 18:
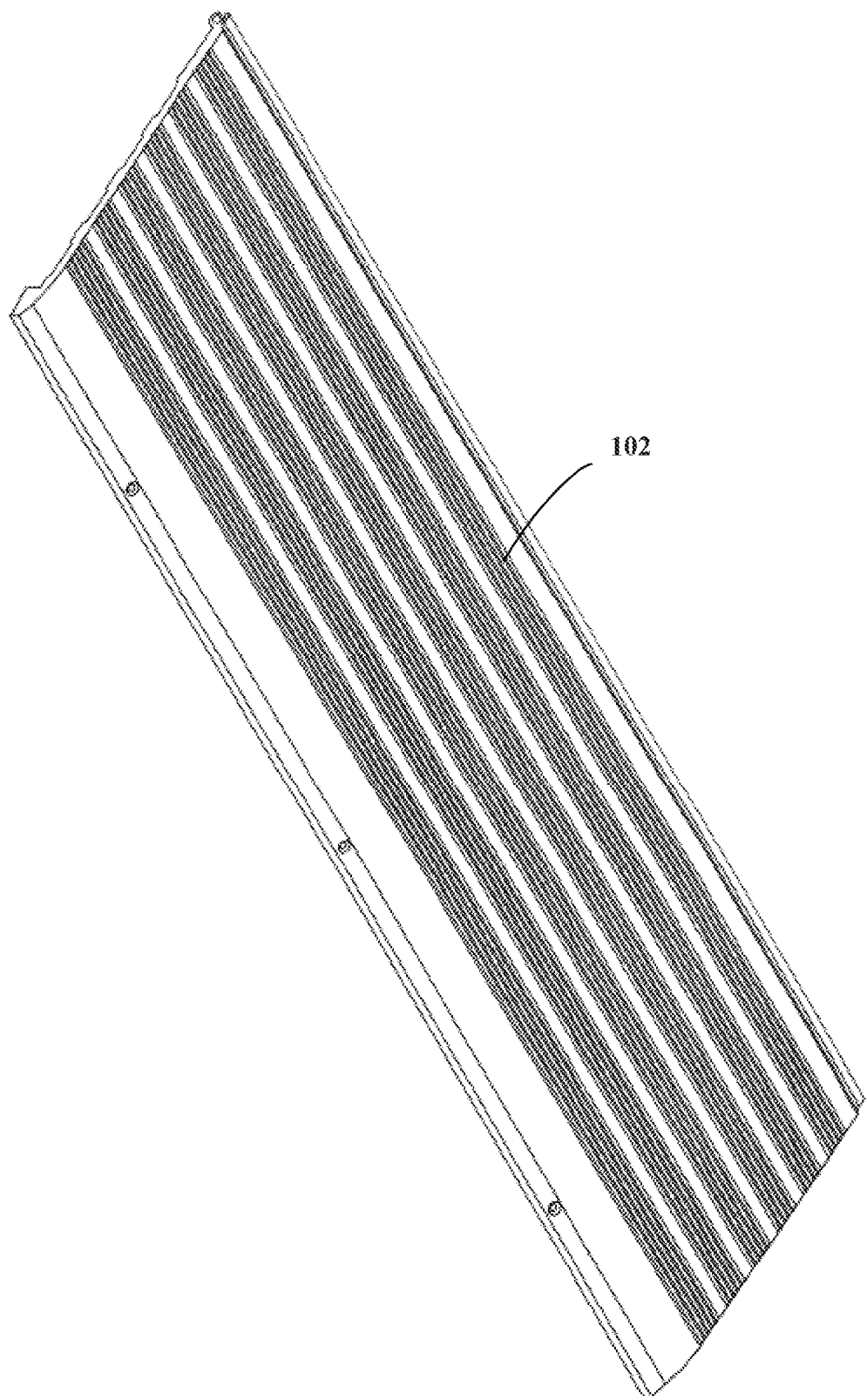
FIG. 18 shows a side perspective view of one embodiment of a threshold.

FIG. 1 shows a base with a threshold at the lower ground access level. There may be provided a special leg segment 100 that is configured to cooperate with a threshold 102. An example of such a leg segment 100 is shown in FIG. 17 and an example of the threshold 102 is shown in FIG. 18. Leg 100 has an upright post 104 and a platform 106. When the ramp is built, the installer can start at the upper destination level and build the ramp downwardly. Thus, the last legs to be secured once the ramp is to be at ground level are legs 100. A telescopically adjustable vertical support 107 may slide over leg 100 at the termination point, and using a pin, fastener 107A or other suitable device, can be locked at a height that coincides with a desired post height. The threshold 102 of FIG. 18 may then be secured to platform 106. This last segment may be referred to as a base segment 109. More detail about the base segment 109 and the additional components that cooperate to form base segment 109 in order to form the beginning of the ramp are shown and described below with respect to FIG. 24.

Figure 25:
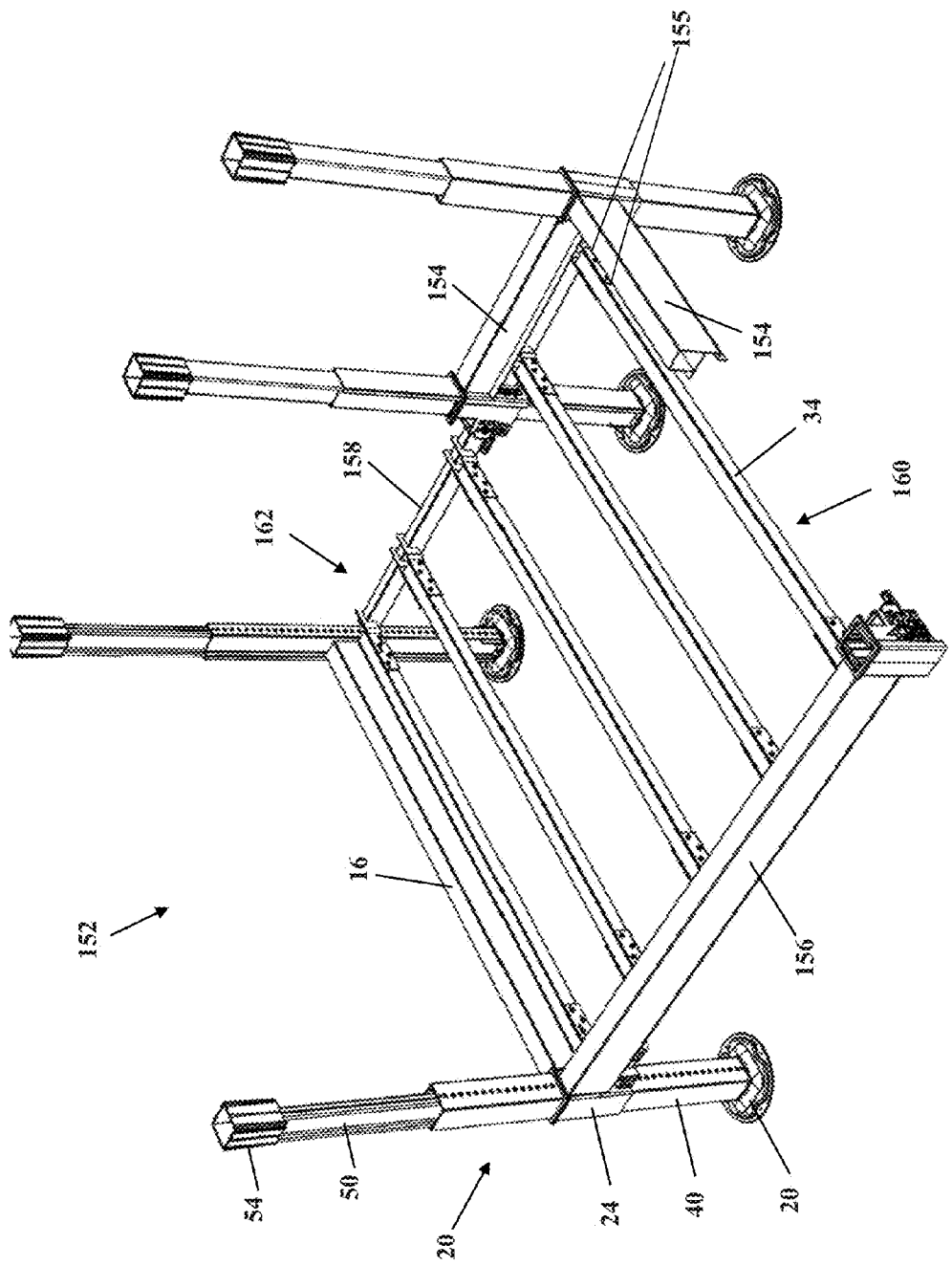
FIG. 25 shows a side perspective view of one embodiment of an L-turn ramp section that may be used to create a right-hand or left-hand turn in the ramp.
Figure 26:
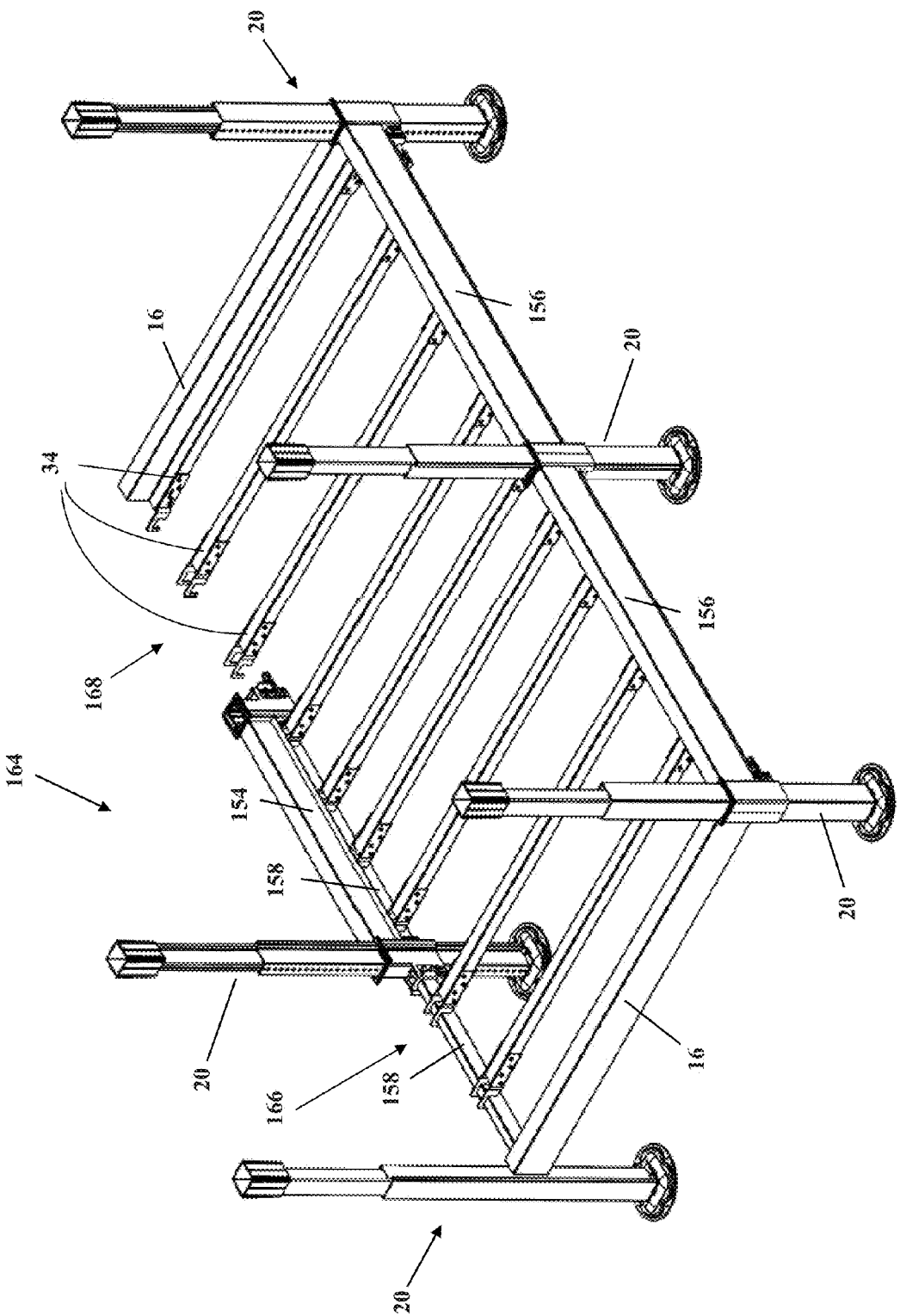
FIG. 26 shows a side perspective view of one embodiment of a U-turn ramp section that may be used to create a U-turn in the ramp.
Figure 27:
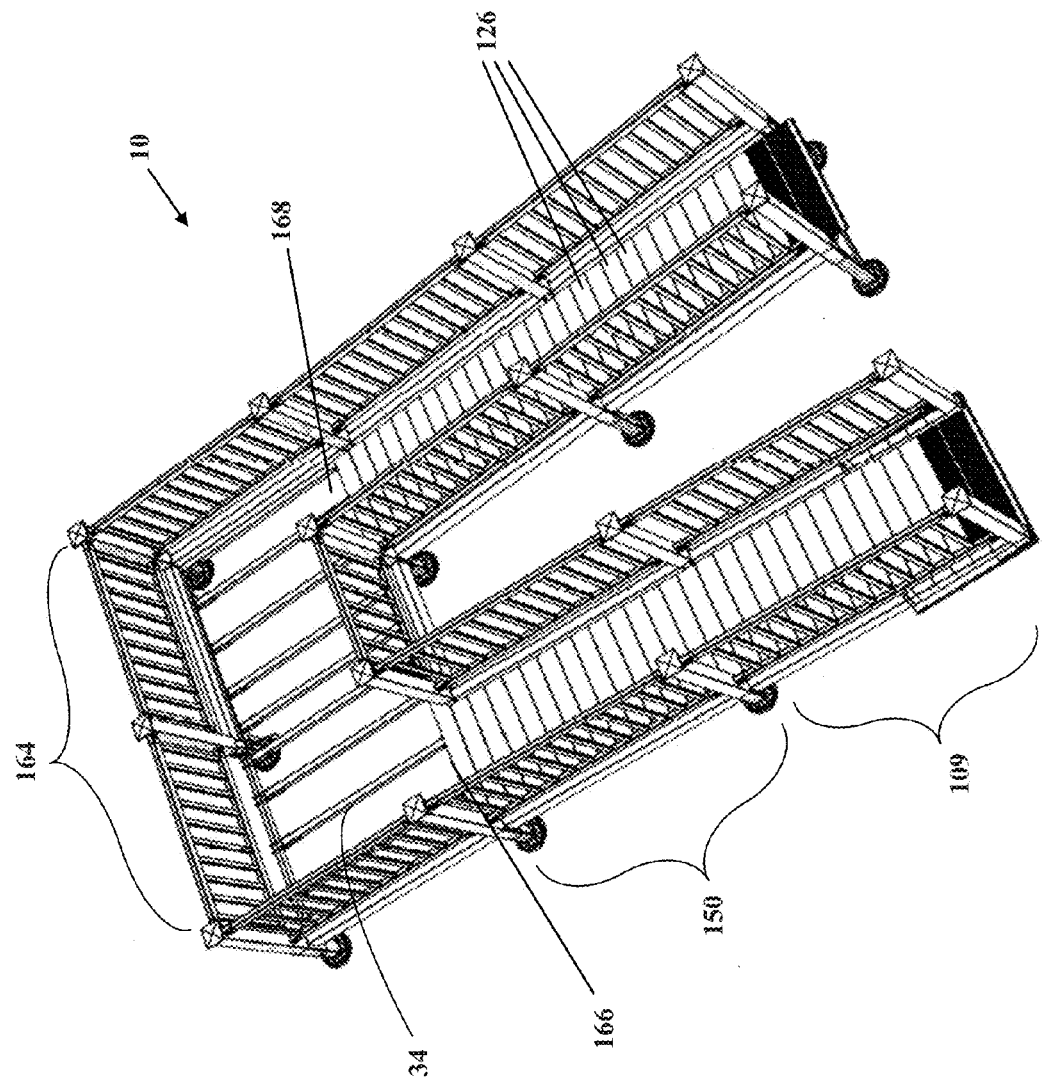
FIG. 27 shows a top perspective view of an assembled wheelchair ramp having a U-turn ramp section of FIG. 26 in place, with deck boards removed at the U-turn ramp section.

Referring back to FIG. 1, a series of adjustable structures 12 are shown secured together. There is a threshold 102 in place on the base segment 109. A landing segment 108 is also shown. Landing 108 may be designed using similar structures as those described above, it may simply use longer bars 26 in order to create a space large enough (and within ADA guidelines) for a wheelchair to maneuver. The landing 108 may be used to create left turns or right turns for the ramp 10. For example, in the ramp 10 illustrated in FIG. 20, a landing 108 is used to cause the ramp 10 to make a right hand turn. Detailed examples of kits that may be used to form landings 108 and turn segments are shown in FIGS. 25-27 and are described in more detail below. In general, it is relevant to note here that certain of the above-described elements may be used in the ramp turn segments in a modified manner in order to provide a left-turn segment 152, a right turn segment, or a U-turn segment 164, causing the direction of the ramp to change.

Figure 19:
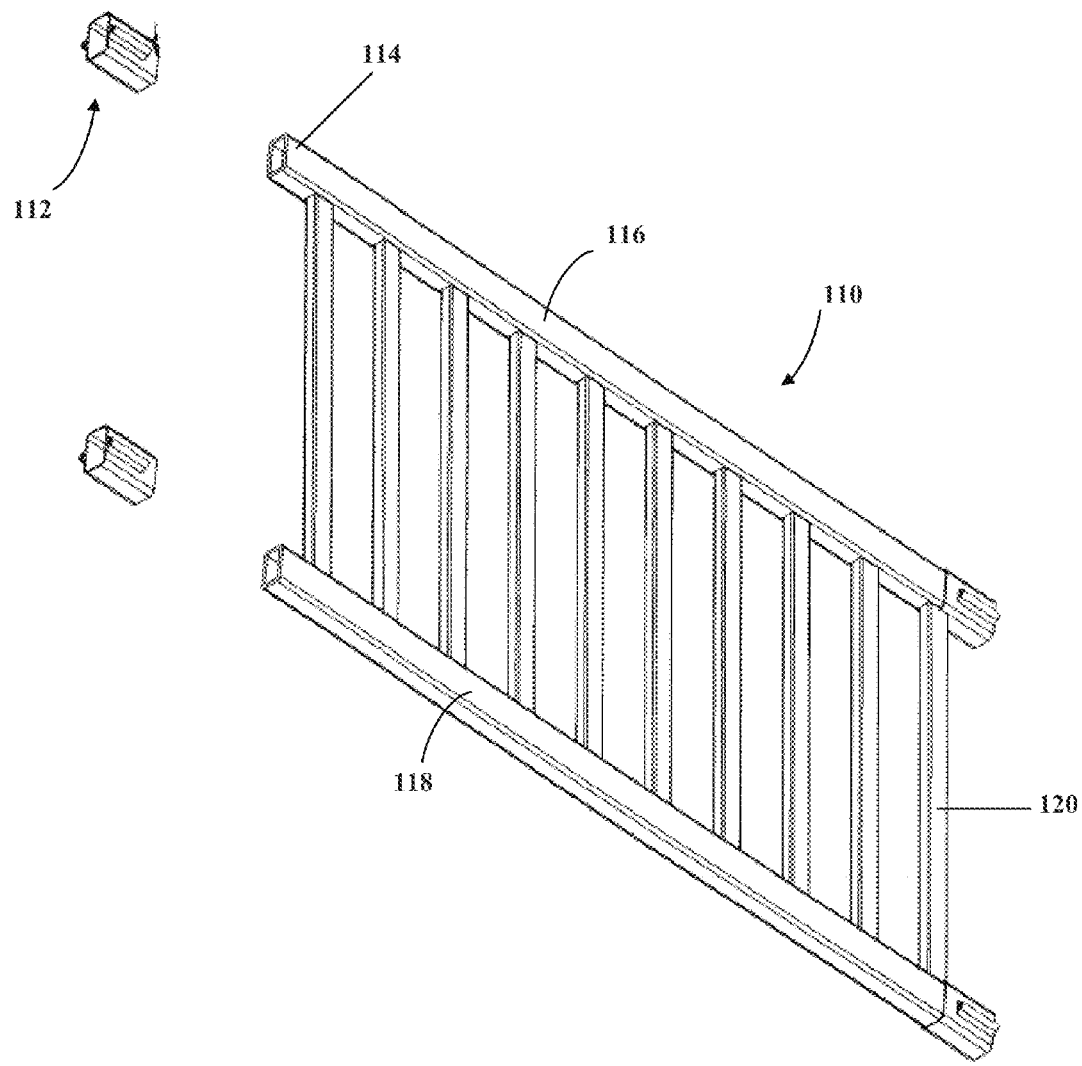
FIG. 19 shows a side perspective view of one embodiment of a railing.

Once structures 12 are positioned, a railing 110 may be secured between the upright legs 20. Railing 110 may be a conventional, currently-available railing 110 that can be used with ramp 10, one example of which is shown in FIG. 19. Alternatively, it is possible to create a specially designed railing for use with the ramps described herein. If a conventional railing is used, then railing connectors 112 may be provided that are designed to connect each end 114 of the railing to whatever the upper portion of upright leg is used, whether it is a leg extender 50 or extender insert 54 and/or a post cover 62. In a specific embodiment, a one-piece railing 110 may be provided that includes a top rail 116, a bottom rail 118, and balusters 120. This railing 110 is positioned between and secured to legs using appropriate fasteners.

A handrail may also be installed in some embodiments. It may either be a conventional, currently-available handrail or a specially designed handrail. Railing may be provided with a handrail formed therewith or secured thereto, or a separate handrail may be installed. In one embodiment, a continuous handrail may be positioned, which includes post returns and corner components that curve around the legs so that the user may have a continuous hand-to-rail connection during use. In some embodiments, the handrail may be designed and installed to comply with ADA requirements. Examples of handrails that are available and acceptable for use with some embodiments described herein are marketed by Severe Weather Rail, commercially available in Lowe's home improvement stores, and illustrated at the following website: www.severeweatherrail.com. As shown in FIG. 20, post cap covers 122 may be placed over the end of the extender insert 54 (after the placement of post covers 62) to provide a clean and finished appearance.

Once all components are tightened and secured, decking material 124, such as deck boards, planks, lumber, wood, plastics, composites, or any other flooring material may be positioned across the joists 34, resting in the internal ledges 32 of each side rail 16. In some embodiments, dimensional lumber may be used. The decking material may be secured in place using any appropriate securement feature. The decking material typically comprises individual deck material pieces that may be positioned lengthwise such that a first end of a piece of decking material rests on the internal ledge 32 of a first side rail 16 and a second end of a piece of decking material rests on the internal ledge 32 of a second side rail 16.

Figure 21:
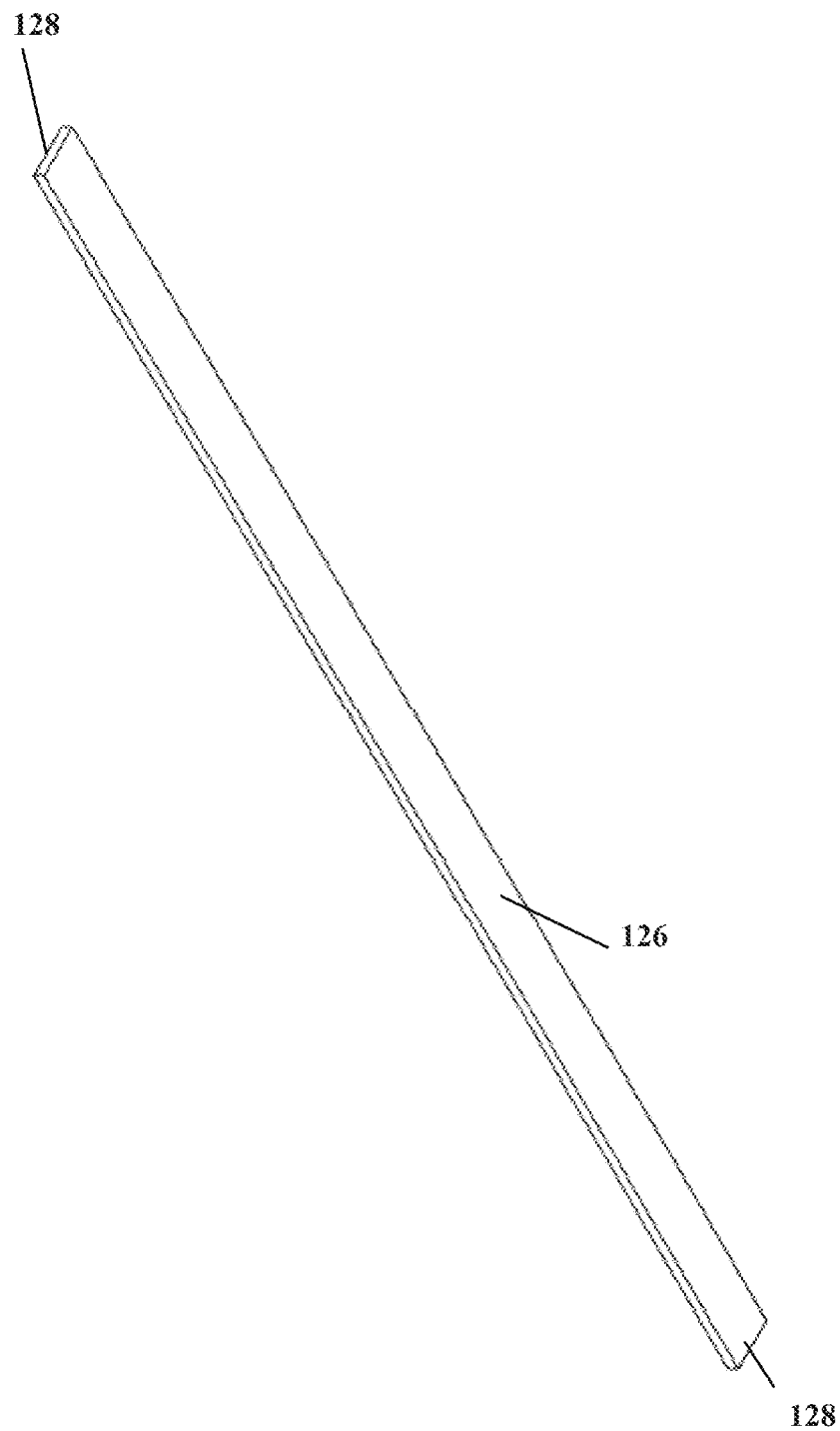
FIG. 21 shows a side perspective view of one embodiment of a deck board or decking material that may be used to complete the wheel chair ramp.

One example of a plurality of deck boards 126 positioned on the ramp 10 is illustrated in FIG. 20. Each deck board 126 has opposite ends 128, each of which rests on an internal ledge 32 of a side rail 16. FIG. 21 shows one embodiment of a deck board 126 that may be used. Deck board or decking materials may be lumber, wood, a composite material, a metal, or any combination thereof. As previously noted, one benefit of some embodiments of the present invention is that the structures can be compatible with dimensional lumber. Particularly useful deck boards may have a cross-sectional height of less than about 4 inches and a cross-sectional width of less than about 8 inches. Examples of dimensional lumber include, but are not limited to 2×4 s, 2×6 s, 2×8 s, ⅝×6 s (in approximate inches), or any other appropriately sized options. The deck boards may be individual boards, rather than large pieces of plywood or preformed platforms.

The ramp system may be sold in kits that have a series of feet, upright legs, bars, adjustable sleeves, side rails, and joists in some embodiments. The user can assemble the desired portions in the desired layout, including adjustable structures 12, one or more landing platforms 108 (if necessary and/or desired), and a base segment 109, and can adjust for terrain, desired incline, and to avoid obstacles, as necessary. The landing platform has similar components, but includes appropriately-sized side rails. Likewise, the base segment 109 has similar components but includes a threshold plate 102.

In one embodiment, a kit may comprise the elements necessary to erect one H-frame. For example, a kit may include two feet, two upright legs (and related parts, such as lower leg segments and extenders), two sleeves, two pins, and one bar. In another embodiment, a kit may comprise the elements necessary to erect one complete adjustable structure. For example, a kit may include a plurality of post feet, a plurality of lower leg segments, a plurality of extenders, a plurality of adjustable sleeves, a plurality of side rails, and a plurality of joists. Optional features that may be included in each kit or sold separately to enhance the clean lines of the ramp include a plurality of post covers and a plurality of post cap covers. A separate kit may be provided for a threshold, and separate kits may be provided for landings.

As a more detailed example, there may be another kit provided that includes the components necessary for building a middle ramp segment 150, as shown in FIG. 23. A builder may identify how long the ramp should be, and then purchase a corresponding number of middle ramp 150 kits in order to build the ramp to the desired length. The components of this kit may include two side rails 16, two foot bases 22, two lower leg segments 40, two leg extensions 50, two extender caps 54, two adjustable sleeves 24, one crossbeam bar 26, two cross braces 144 to provide additional bracing (or stability) if needed, four rail brackets 142 (to secure the side rails 16 to the frame), and two frame caps 140 (which are positioned at an upper part of sleeve 24). If needed or desirable, the kit also can include one or more joists 34. When a ramp or deck reaches a certain height or length, additional support may be used, such as one or more cross braces 144. In one embodiment, cross braces 144 may be used on the fourth ramp and higher. The braces may be designed as individual bars that are installed on lower leg segment 40. In the particular embodiment shown, a first cross bar is secured at an upward angle with respect to the two legs that form the H-frame, and a second cross bar is secured at a downward angle with respect to the two legs that form the H-frame. The cross bars collectively form a cross brace 144 in the shape of an "X" that provides increased stability as the structure height or length increases.

The kit further can further include two post cover sleeves 62 and two post cap covers 122. Additional appropriate brackets, screws, nuts, may also be included to secure the above-described components together.

Figure 24:
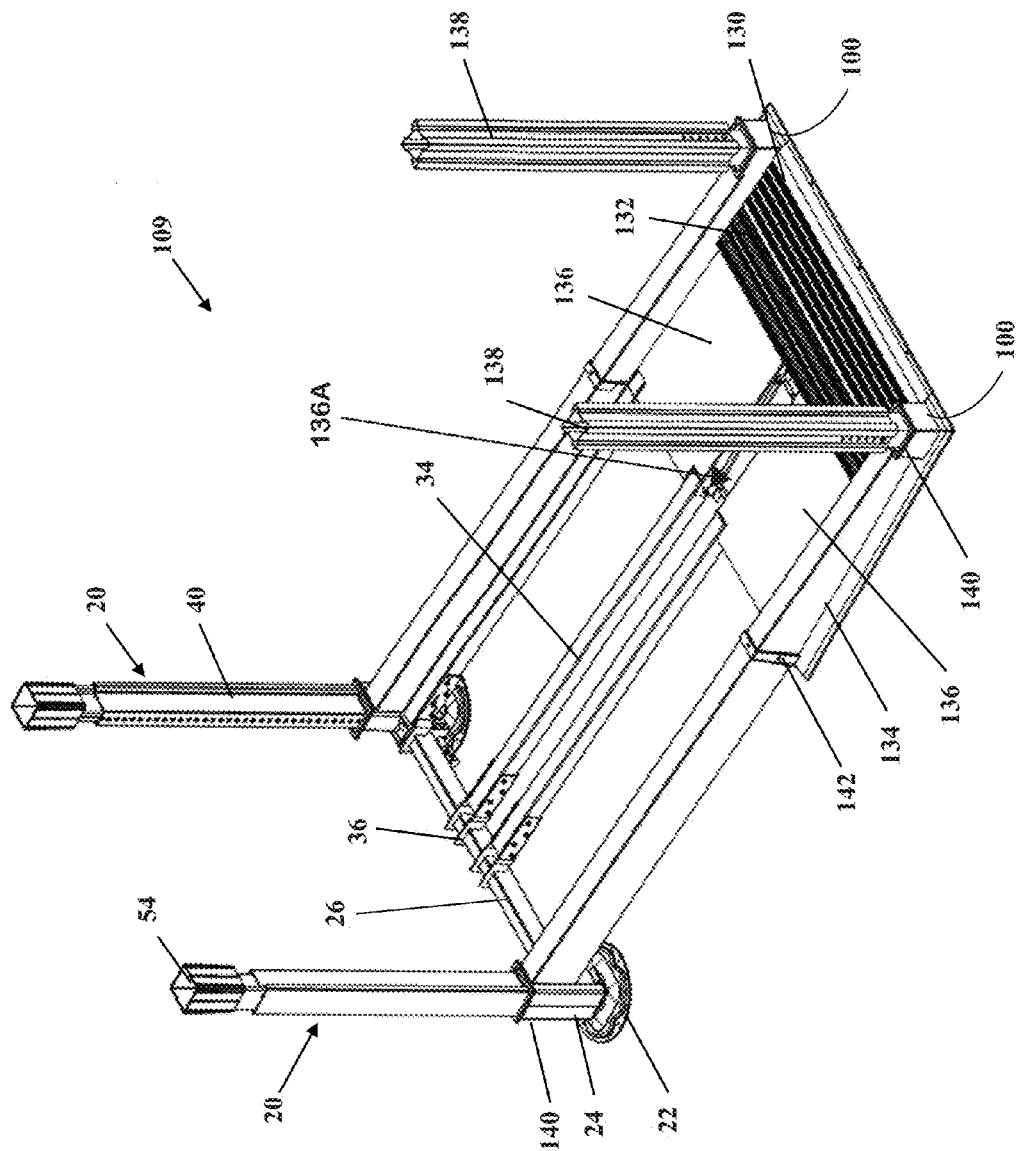
FIG. 24 shows a side perspective view of the components that may be used to build a beginning ramp section.

As a further example, there may be another kit provided that includes the components necessary for building the base segment 109, as shown in FIG. 24. The base segment 109 can be configured to facilitate transitions onto and off of the ramp by a person in a wheelchair. The components may include one or more threshold 102 components, which in a specific embodiment may be a threshold plate 130 and a threshold plank 132. There may also be left and right threshold shrouds 134 configured to be positioned on either side of the threshold, and two threshold supports 136 configured to be positioned adjacent the joists 34 in use. Two joists 34 and one crossbeam bar 26 may also be provided, with the joists 34 each having one end configured to secure to the threshold supports 136 and the other end having an attachment hook or bracket 36 configured to secure to the crossbeam bar 26.

In some embodiments, a threshold support spacer 136A can be positioned between the two threshold supports 136. The spacer 136A can be configured to have a rectangular shape with: (1) a width that corresponds to a distance between supports 136 that results in a first standard ramp width (e.g., approximately 36 inches of ramp width) and (2) a length that corresponds to the distance between supports 136 that results in a second, wider standard ramp width (e.g., approximately 48 inches of ramp width). Orienting the spacer 136A as shown in FIG. 24 (with its longest sides against the supports 136) results in a ramp section of the first (smaller) width and rotating the spacer 136A approximately 90 degrees (so that its shorter sides bear against the supports 136) results in a ramp section of the second, wider width. Other embodiments of the spacer 136A can be configured as multiple alternative spacers, as polygons that have more than four sides, or as combinations of one or more additional spacers, to achieve spacing between supports 136 that corresponds to three or more different ramp widths.

The beginning ramp section may also have modified leg components that differ from upright legs 20, which may include two special leg segments 100, over each of which is positioned a telescopically adjustable vertical support 138. The telescopically adjustable vertical support 138 can be provided with a cloverleaf-like cross-section. Two frame caps 140 are provided in the kit as well, and they can be positioned so that sliding of each post cover 62 down over a vertical support 138 brings the bottom of the post cover 62 to rest on the frame cap 140. The kit also includes two side rails 16 and two side rail threshold brackets 142, which are designed to secure the side rails 16 to the threshold shrouds 134.

The kit may also include the components for building two upright legs 20, namely two foot bases 22, two lower leg segments 40, two extender posts 54, and two adjustable sleeves 24. Two more frame caps 140 may also be included to support the transition between leg and sleeve and to provide a place for a subsequently applied post cover 62 to rest. The kit can further include four post cap covers 122 and the four post covers 62 (e.g., as shown in FIGS. 8A and 8B) which can be positioned around the two entry leg posts (i.e., around the vertical supports 138) and around the portion of each leg 20 that extends above its corresponding adjustable sleeve 24. Additional appropriate brackets, screws, nuts, are also included that are used to secure the above-described components together.

Further examples of kits that may be provided separately are kits that include the components necessary for building a landing 108 that leads to a left or right-hand turn (referred to as an L-turn) 152 or a landing that provides a U-turn ramp segment 164, examples of which are shown in FIGS. 25-27. The components included in a kit for creating one embodiment of an L-turn ramp segment 152 are shown in FIG. 25. The components included in a kit for creating one embodiment of a U-turn ramp segment 164 are shown in FIG. 26. FIG. 27 shows a completed U-turn ramp.

Referring now to FIG. 25, the L-turn ramp segment 152 kit may include components to make five upright legs 20 (one is not shown for ease of viewing), including five foot bases 22, five lower leg segments 40, five extenders 50, five extender caps 54, and five adjustable sleeves 24. It should also be understood that the legs may be sold in separate kits of multiple legs if so desired. The kit also includes one full-length side rail 16, two shortened rail covers 154, and one full length rail cover 156. Rail covers 154, 156 are similar in design and function to side rails 16, except that they do not feature an internal ledge. They are provided to form a decorative edge for the landing 108, but do not need to have a lip to support decking material in some embodiments.

The kit also includes two crossbeam bars. It is possible for the crossbeam bars to be elongated bars that span two H-frames (e.g., one of which would be located beneath the rail cover 156 in FIG. 25) or they may be provided as individual smaller bars 158, as illustrated. FIG. 25 shows four joists 34 positioned across and secured to bars 26, 158. It should be understood that more or fewer joists may be provided. The kit may further include five post cover sleeves 62 and five post cap covers 122. Additional appropriate brackets, screws, nuts, are also included that are used to secure the above-described components together. Once L-turn ramp 152 has been constructed, it provides a first open section 160 and a second open section 162. Each open section 160, 162 provides a space to which joists of a middle ramp section 150 may be secured. While not shown, an additional cross-bar or similar structure may be included near open section 160 to facilitate connection with one or more joists from a connecting middle ramp section 150. As an alternative to providing an additional cross-bar adjacent to open section 160, the adjacent rail cover 154 can be supported using one or more joist-to-cover support brackets 155. Examples of joist-to-cover support brackets 155 are shown in FIG. 31.

Figure 30:
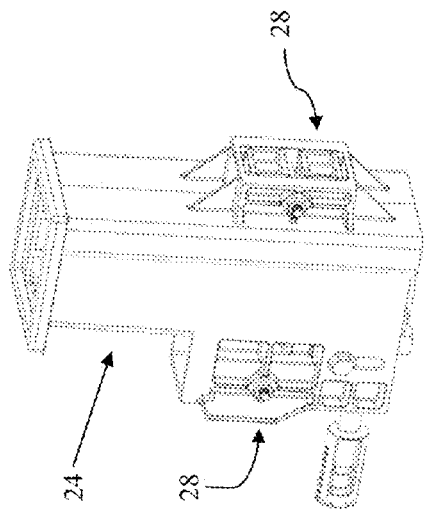
FIG. 30 shows a perspective view of still another embodiment of an adjustable sleeve.
Figure 29:
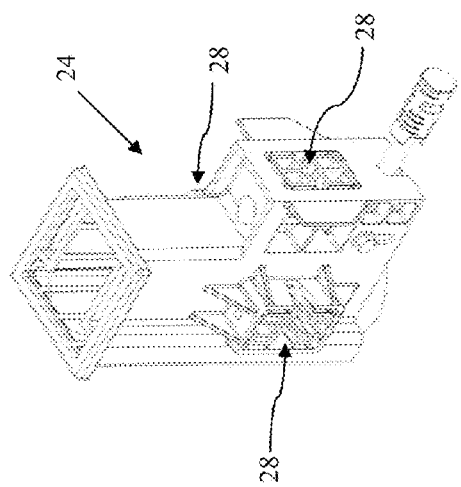
FIG. 29 shows a perspective view of yet another embodiment of an adjustable sleeve.
Figure 28:
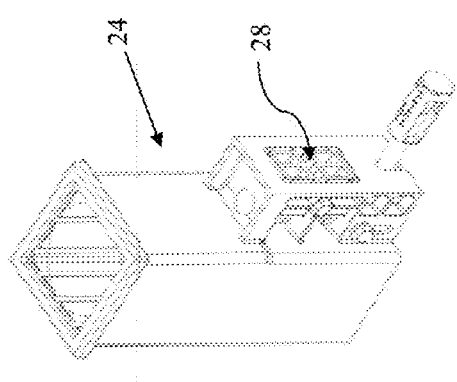
FIG. 28 shows a perspective view of another embodiment of an adjustableسleeve.

As shown in FIGS. 28-30, the adjustable sleeves 24 can be provided with different arrangements of receiving portions 28, each of which arrangement is suited to one or more locations of the adjustable sleeve 24 around the L-turn ramp segment 152 or U-turn ramp segment 164. The embodiment of adjustable sleeve 24 shown in FIG. 28 includes one receiving portion 28 for a crossbar 26 (or 158). Another embodiment of adjustable sleeve 24 shown in FIG. 29 includes three receiving portions 28 arranged orthogonally around the sleeve 24. Still another embodiment of adjustable sleeve 24 shown in FIG. 30 includes two receiving portions arranged on opposite sides of the adjustable sleeve 24.

The L-turn segment shown in FIG. 25 could also be used, or modified for use as a landing to make a right turn. In some embodiments, the landing portion of the L-turn or R-turn segment can be dimensioned to comply with ADA or other government requirements.

A kit for building a landing 108 that results in a U-turn segment 164 is shown in FIG. 26. This kit includes the components to make six upright legs 20 (one is not shown for ease of viewing), including six foot bases 22, six lower leg segments 40, six extenders 50, six extender caps 54, and six adjustable sleeves 24. It should also be understood that the legs may be sold in separate kits of multiple legs if so desired. The kit also includes two full-length side rails 16, one shortened rail cover 154, and two full length rail covers 156. Rail covers 154, 156 are similar in design and function to side rails, except that they do not feature an internal ledge. They are provided to form a decorative edge for the landing 108, but do not need to have a lip to support decking material.

The kit also includes four crossbeam bars 26. It is possible for the crossbeam bars 26 to be elongated bars that span two H-frames (e.g., two of which would be located beneath the rail covers 156) or they may be provided as individual smaller bars 158, as illustrated. Because the landing required for a U-turn is relatively large, FIG. 26 shows eight joists 34 positioned across and secured to bars 26, 158. It should be understood that more or fewer joists may be provided. The kit may further include six post covers 62 and six post cap covers 122. Additional appropriate brackets, screws, nuts, are also included that are used to secure the above-described components together. Once U-turn ramp 164 has been constructed, it provides a first open section 166 and a second open section 168, both of which are positioned on the same side. Each open section 166, 168 provides a space to which joists 34 of a middle ramp section 150 may be secured, or joists 34 of ramp 164 may be secured to a bar 26 of a middle ramp section 150.

In some embodiments, the landing portion of a U-turn segment can be dimensioned to comply with ADA or other government requirements.

FIG. 27 shows an assembled ramp 10 with a U-turn ramp segment 164 in place, but with deck boards 126 removed from the segment 164 to show joists 34. This figure illustrates how open sections 166, 168 are designed to allow connection of middle ramp segments 150 thereto, and how base segments 109 may secure to middle ramp segments 150 in order to provide a completed ramp structure 10.

Further kits may be sold that simply include a number of post feet 22, a number of joists 34, a number of cross bars 26, a number of post extenders 50 or 54, or a number of post covers 62 or caps 122.

Figure 22:
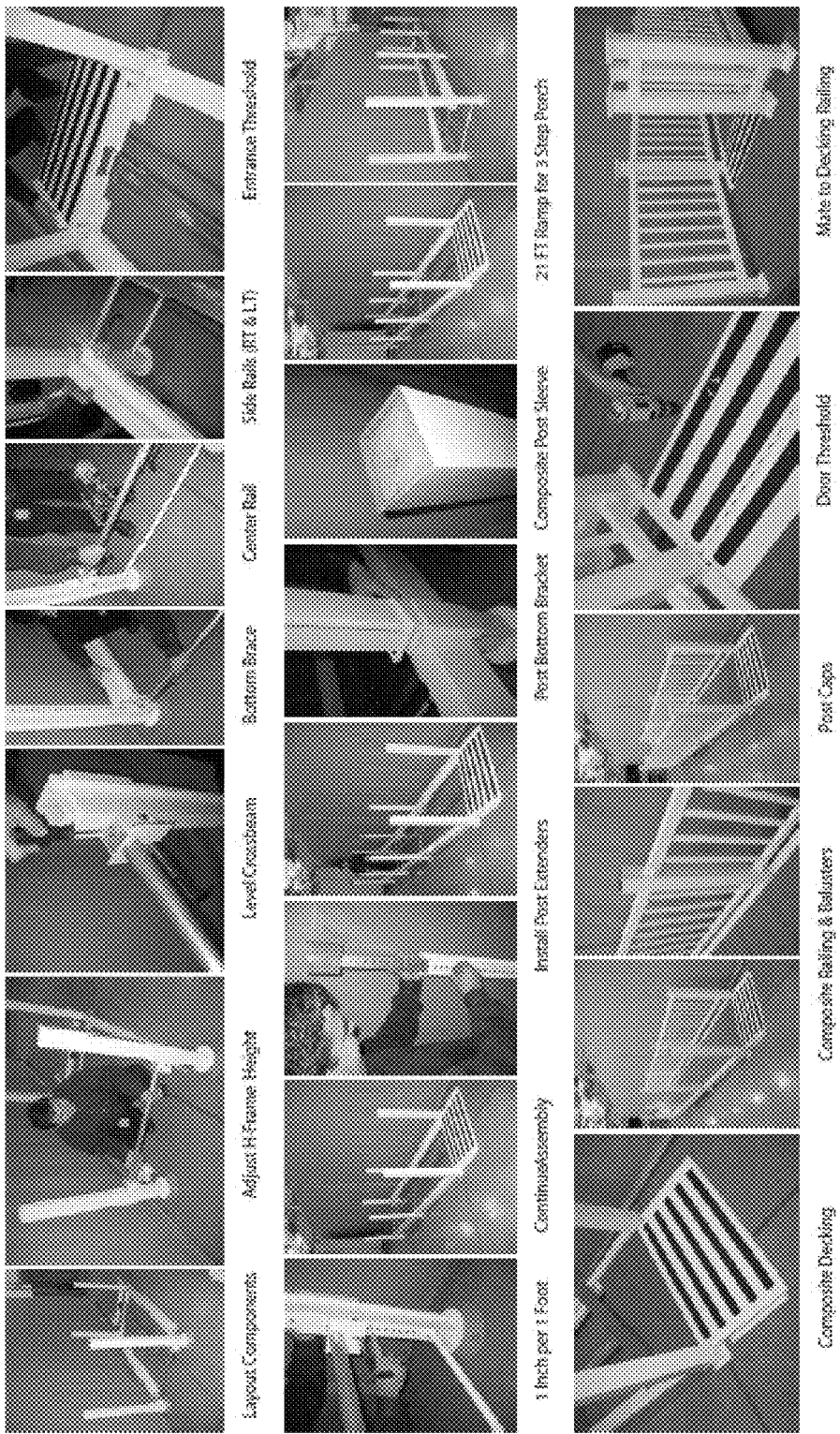
FIG. 22 shows a storyboard of one embodiment of a method for assembling a wheelchair ramp having many of the above components.

Some embodiments of the present invention also relate to methods of assembling ramp systems. Assembly methods may vary depending on the particular embodiment of the ramp system to be assembled as well as user preference. FIG. 22 shows one specific method with steps for installation. In summary, installation steps generally include erecting an adjustable frame substructure by (i) positioning a first set of two upright legs on a surface, (ii) sliding an adjustable sleeve on each upright leg and securing the adjustable sleeve at a desired height using a coarse height adjustment structure; (iii) positioning a bar to span a width between the two upright legs such that the bar cooperates with the adjustable sleeves to create a first frame; (iv) positioning a second set of two upright legs, adjustable sleeves, and a bar to create a second frame a distance from the first frame; (v) positioning a set of two side rails to span the distance between the first frame and the second frame; (vi) positioning at least one joist between the first frame and the second frame, wherein the joist has two ends, wherein a first end of the joist is positioned on the bar in the first frame and the second end of the joist is positioned on the bar in the second frame. Once the adjustable frame substructure has been assembled, the next step is positioning a plurality of deck boards on the frame substructure and then securing the deck boards in place. It is also preferable to install a threshold, to install a post sleeve (or cover) and post cap over each upright leg, and to install a railing and handrail. Other assembly methods can be appreciated by those of skill in the art based on the particular ramp system to be installed.

The assemblies described herein can be compatible with many varieties, colors and styles of lumber, railings, balusters, decking and ramp materials. This provides flexibility in aesthetic design (since a plethora of commercially available materials and products can be employed), while allowing modular deployment of the supporting substructure and while reducing, if not eliminating, the need to cut the lumber (e.g., the posts) and reducing, if not eliminating, the need to dig and pour footers for the substructure. In this regard, embodiments disclosed herein can achieve the benefits of an easy-to-assemble, modular substructure without sacrificing the design versatility that might only be available as a result of compatibility with commercially available dimensional lumber and standard construction materials/products. For retailers, who usually are limited in merchandising space, the compatibility provided by the disclosed embodiments advantageously doesn't require that the retailer stock additional, specialty decking, specialty railing, specialty balusters, and other specialty items that are compatible only with the modular ramp system. The disclosed embodiments therefore tend to conserve retail/merchandising space.

As discussed above, the assemblies described herein may also be used to create a raised structure, such as a temporary deck structure, patio structure, or any other structure that benefits from being assembled in a modular nature and/or in a raised configuration. For example, a series of H-frames 14 and/or adjustable structures 12 may be assembled to create a raised platform of any desired dimension. For a deck structure embodiment, it may be desirable to provide upright legs 20 having shorter dimensions, such that they do not extend above the decking material 124 that is ultimately positioned along the joists 34 and side rails 16. It may also be desirable to provide modified side rails. The side rails may be designed as double-sided side rails, such that each side rail for the deck design has an internal ledge 32, as well as an external ledge. The internal ledge is configured to receive deck materials 124 as described above, and the external ledge may receive additional deck materials in order to complete the deck. This modification would allow multiple adjustable structures 12 to be positioned end-to-end and side-by-side. It should be understood that other modification are possible and considered within the scope of this disclosure.

In use, a deck builder may position multiple adjustable structures side-by-side and length-to-length in order to provide a platform that is the width and length of many adjustable structures. This allows the user to define the size of the desired deck structure, without being limited by pre-manufactured deck materials. For example, the user may decide to build a deck that is the width of five adjustable structures 12 and the length of three adjustable structures 12. In such an example, a user may purchase the appropriate number of kits that provide the appropriate components for such a structure. The user may then position five adjustable structures side-by-side in rows of three deep, using relevant modified components for a deck structure. The user may then position traditional or conventional deck materials 124 over the assembled frame.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A modular system for assembling a ramp, deck, or other raised structure comprising:
   (a) a plurality of adjustable structures, each adjustable structure comprising:
      (i) first and second legs;
      (ii) a bar configured to span a width between the legs;
      (iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar;
      (iv) first and second side rails for connecting a first adjustable structure to a second adjustable structure, wherein the first side rail cooperates with the first adjustable member on the first adjustable structure and the first adjustable member on the second adjustable structure, and wherein the second side rail cooperates with the second adjustable member on the first adjustable structure and the second adjustable member on the second adjustable structure, such that movement of one of the adjustable members relative to its corresponding leg adjusts the height of a corresponding end of the side rail,
      wherein each side rail further comprises an internal ledge configured to support individual lumber or composite board pieces that may be positioned lengthwise such that a first end of a piece of decking material rests on the internal ledge of the first side rail and a second end of a piece of decking material rests on the internal ledge of the second side rail.

2. The modular system of claim 1, further comprising handrails.

3. The modular system of claim 1, wherein each adjustable member has a coarse height adjustment structure that allows the position of the adjustable member to move and selectively be locked in pre-determined increments with respect to its corresponding leg.

4. The modular system of claim 3, wherein the coarse adjustment structure comprises a movable pin that is selectively movable into or out from any one of a plurality of openings on the leg.

5. The modular system of claim 1, further comprising at least one joist configured to be positioned between at least two adjustable structures, wherein the joist comprises two ends, wherein a first end of the joist is coupled to the bar on a first adjustable structure, and wherein a second end of the joist is coupled to the bar on a second adjustable structure.

6. The modular system of claim 1, wherein each leg is configured to be coupled with a foot structure that allows the leg to pivot multidirectionally relative to the foot structure.

7. The modular system of claim 6, wherein the foot structure permits the leg to pivot multidirectionally about 10 degrees relative to the foot structure.

8. The modular system of claim 1, wherein at least one of the adjustable members is configured as an adjustable sleeve.

9. The modular system of claim 1, further comprising:
   a threshold adapted to serve as a transition to or from the ramp, deck, or other raised structure; and
   a base segment substructure adapted to support a base segment of the ramp, deck or other raised structure.

10. The modular system of claim 9, further comprising alternative configurations of the adjustable structures which are configured to facilitate incorporation of one or more turns in the ramp, deck, or other raised structure.

11. A modular system for assembling a ramp, deck, or other raised structure comprising:
    (a) a plurality of adjustable structures, each adjustable structure comprising:
       (i) first and second legs;
       (ii) a bar configured to span a width between the legs;
       (iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar;
       (iv) first and second side rails for connecting a first adjustable structure to a second adjustable structure, wherein the first side rail cooperates with the first adjustable member on the first adjustable structure and the first adjustable member on the second adjustable structure, and wherein the second side rail cooperates with the second adjustable member on the first adjustable structure and the second adjustable member on the second adjustable structure, such that movement of one of the adjustable members relative to its corresponding leg adjusts the height of a corresponding end of the side rail; and
       (v) a plurality of deck boards coupled to the first and second side rails, wherein the deck boards have a cross-sectional height of less than 4 inches and a cross-sectional width of less than 8 inches.

12. A modular system for assembling a ramp, deck, or other raised structure comprising:
    (a) a plurality of adjustable structures, each adjustable structure comprising:
       (i) first and second legs;
       (ii) a bar configured to span a width between the legs;
       (iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar;
       (iv) first and second side rails for connecting a first adjustable structure to a second adjustable structure, wherein the first side rail cooperates with the first adjustable member on the first adjustable structure and the first adjustable member on the second adjustable structure, and wherein the second side rail cooperates with the second adjustable member on the first adjustable structure and the second adjustable member on the second adjustable structure, such that movement of one of the adjustable members relative to its corresponding leg adjusts the height of a corresponding end of the side rail; and (v) a plurality of deck boards coupled to the first and second side rails, wherein the deck boards comprise wood, a composite material, or combinations thereof.

13. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar; and
(iv) first and second side rails for connecting a first adjustable structure to a second adjustable structure, wherein the first side rail cooperates with the first adjustable member on the first adjustable structure and the first adjustable member on the second adjustable structure, and wherein the second side rail cooperates with the second adjustable member on the first adjustable structure and the second adjustable member on the second adjustable structure, such that movement of one of the adjustable members relative to its corresponding leg adjusts the height of a corresponding end of the side rail, wherein the first and second side rails are length-adjustable.

14. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar, wherein the adjustable structure comprises at least one extender insert in cooperation with at least one leg, wherein the height of the extender insert is adjustable relative to the leg.

15. The modular system of claim 14, further comprising a post sleeve positioned over each leg and extender insert.

16. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar; and
(iv) a post sleeve positioned over each leg.

17. The modular system of claim 16, further comprising one or more handrails coupled to the post sleeves.

18. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar,
wherein each adjustable member has (1) a coarse height adjustment structure that allows the position of the adjustable member to move and selectively be locked in pre-determined increments with respect to its corresponding leg and (2) a fine height adjustment structure that allows the adjustable member to move and be locked in position in increments smaller than the coarse height adjustment structure relative to its corresponding leg.

19. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar
wherein each adjustable member has (1) a coarse height adjustment structure that allows the position of the adjustable member to move and selectively be locked in pre-determined increments with respect to its corresponding leg and (2) a fine height adjustment structure allows for height adjustments of less than one inch.

20. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar; and
(iv) at least one joist configured to be positioned between at least two adjustable structures, wherein the joist comprises first and second ends, with the first end configured to be coupled to the bar on a first adjustable structure and the second end configured to be coupled to the bar on a second adjustable structure, wherein each of the first and second ends of the joist comprises a hook-like structure that, when engaged to one of the bars of an assembled one of the adjustable structures, comprises a substantially horizontal portion and two substantially vertical portions, wherein the distance between the two substantially vertical portions is greater than the width or diameter of the bar on the corresponding adjustable structure.

21. The modular system of claim 20, wherein the hook-like structures are configured to limit rotation of the joist ends when the hook-like structures engage one of the bars of the adjustable structures.

22. The modular system of claim 20, wherein the hook-like structures are configured to limit joist slope when the hook-like structures engage one of the bars of the adjustable structures.

23. The modular system of claim 20, wherein the hook-like structures are configured to limit joist slope to less than about 10 degrees relative to horizontal.

24. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar; and
(iv) at least one joist configured to be positioned between at least two adjustable structures, wherein the joist comprises first and second ends, with the first end configured to be coupled to the bar on a first adjustable structure and the second end configured to be coupled to the bar on a second adjustable structure, wherein each of the first and second ends of the joist comprises a means for controlling a joist slope relative to a vertically oriented one of the adjustable structures.

25. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar,
wherein the adjustable structure bars are length-adjustable in order to allow the width of the adjustable structure to be adjusted and to allow the modular ramp system to accept variously-sized decking material.

26. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar,
wherein the modular system is configured to be compatible with dimensional lumber and conventional post décor and railing products, so that the ramp, deck, or other raised structure that is assembled using the modular system can benefit from the aesthetic design versatility provided by the various options in dimensional lumber and conventional post décor and railing products.

27. A modular system for assembling a ramp, deck, or other raised structure comprising:
(a) a plurality of adjustable structures, each adjustable structure comprising:
(i) first and second legs;
(ii) a bar configured to span a width between the legs;
(iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar, wherein at least one of the adjustable members is configured as an adjustable sleeve, wherein the adjustable sleeve includes a coarse adjustment structure and a fine adjustment structure.

28. A modular system for assembling a ramp, deck, or other raised structure comprising:
   (a) a plurality of adjustable structures, each adjustable structure comprising:
      (i) first and second legs;
      (ii) a bar configured to span a width between the legs;
      (iii) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions when the adjustable members are connected to the bar; and
      (iv) a slope limiting structure adapted to prevent assembly of the ramp, deck or other raised structure with a slope that exceeds a predetermined value greater than zero degrees with respect to horizontal.

29. A method of assembling a ramp, deck, or other raised structure, comprising:
   (a) erecting an adjustable frame substructure, comprising
      (i) positioning a first set of two legs on a surface,
      (ii) sliding an adjustable sleeve on each leg and securing the adjustable sleeve at a desired height using a first height adjustment structure;
      (iii) positioning a bar to span a width between the two legs such that the bar cooperates with the adjustable sleeves to create a first frame;
      (iv) positioning a second set of two legs, adjustable sleeves, and a bar to create a second frame a distance from the first frame;
      (v) positioning a set of two side rails to span the distance between the first frame and the second frame;
      (vi) positioning at least one joist between the first frame and the second frame, wherein each joist has two ends, wherein a first end of the joist is positioned on the bar in the first frame and the second end of the joist is positioned on the bar in the second frame; and
   (b) positioning a plurality of deck boards on the frame substructure.

30. The method of claim 29, further comprising installing a threshold.

31. The method of claim 29, further comprising installing post décor over each leg.

32. The method of claim 29, further comprising installing a hand rail.

33. The method of claim 29, further comprising installing post caps.

34. A modular system for assembling a ramp, deck, or other raised structure comprising:
   (a) a plurality of adjustable structures, each adjustable structure comprising:
      (i) first and second legs;
      (ii) a bar configured to span a width between the legs;
      (iii) adjustable members configured to cooperate with the first and second legs, respectively, wherein the adjustable members cooperate with respective ends of the bar;
   (b) first and second side rails configured to connect to a first adjustable structure separated a distance from a second adjustable structure, wherein the side rails span the distance between the first adjustable structure and the second adjustable structure, wherein the bar and the side rails cooperate with the adjustable members, such that movement of one of the adjustable members relative to its corresponding leg adjusts the height of a corresponding end of the bar and of the side rail in cooperation with the adjustable member, wherein each side rail comprises an internal ledge configured to support individual lumber or composite board pieces that may be positioned lengthwise such that a first end of a piece of decking material rests on the internal ledge of the first side rail and a second end of a piece of decking material rests on the internal ledge of the second side rail; and
   (c) a joist configured to be positioned between the first adjustable structure and the second adjustable structure and between the side rails, wherein the joist has two ends, and wherein a first end of the joist is positioned so as to be supported by the bar in the first adjustable structure and the second end of the joist is positioned so as to be supported on the bar in the second adjustable structure.

35. A modular system for assembling a ramp, deck, or other raised structure comprising:
   (a) at least two adjustable structures, each adjustable structure comprising an H-frame with:
      (i) first and second legs;
      (ii) a bar configured to span a width between the legs;
      (iii) first and second adjustable members configured to cooperate with the first and second legs and to support the bar;
   (b) at least one joist configured to be coupled to the bar of a first H-frame and to the bar of a second H-frame, wherein the joist has two ends with each end comprising a hook-like structure that limits joist rotation relative to at least one of the bars.

36. An adjustable structure, comprising:
   (a) first and second legs;
   (b) a bar configured to span a width between the legs;
   (c) a first adjustable member configured to cooperate with the first leg and a second adjustable member configured to cooperate with the second leg, wherein the first adjustable member is adapted to connect with a first end of the bar and the second adjustable member is adapted to connect with a second end of the bar in order to create a frame, wherein movement of the first and second adjustable members with respect to the first and second legs causes relative movement of the bar to varying height positions,
   wherein each adjustable member comprises (i) a coarse height adjustment structure configured to allow the position of the adjustable member to move and be selectively locked in pre-specified increments with respect to its corresponding leg and (ii) a fine height adjustment structure configured to allow the adjustable sleeve to move and be selectively locked in increments smaller than the coarse height adjustment structure relative to its corresponding leg.

37. A modular ramp system comprising:
   (a) a plurality of adjustable structures, each adjustable structure comprising an H-frame with:
      (i) first and second legs;
      (ii) a bar configured to span a width between the legs; and
      (iii) first and second adjustable members configured to cooperate with the first and second legs and to support the bar;
   (b) first and second side rails configured to connect a first H-frame to a second H-frame that is separated a distance from the first H-frame, wherein the side rails span the distance between the H-frames and cooperate with the adjustable members, such that movement of one of the adjustable members relative to its corresponding leg adjusts the height of a corresponding end of the bar and of the side rail in cooperation with the adjustable member;

(c) a joist configured to be positioned between the first H-frame and the second H-frame and between the side rails, and secured to two of the bars that span the width between the two legs of each H-frame, wherein the joist has two ends with each end comprising a hook-like structure that limits rotation of the joist relative to the bars;

(d) at least one extender insert configured to cooperate with at least one leg, wherein the height of the extender insert is adjustable relative to the leg;

(e) at least one item of post décor configured to be positioned over or around each leg and extender insert;

(f) at least one post cap; and (g) at least one threshold.

38. A modular ramp system comprising a ramp frame substructure adapted to be assembled into an H-shaped configuration, wherein the ramp frame substructure comprises a series of frame elements configured to receive a plurality of deck boards to form a ramp, and wherein:

(a) the frame elements are adjustable to accommodate at least one of: (i) variations in terrain, and (ii) a desired slope of the ramp, without needing to cut the frame elements; and (b) the frame elements are configured to be compatible with dimensional lumber and conventional post décor and railing products, so that the ramp can benefit from the aesthetic design versatility provided by the various options in dimensional lumber and conventional post décor and railing products.

39. A method for assembling the modular ramp system of claim 38, comprising:

(a) erecting the ramp frame substructure;

(b) adjusting aspects of the ramp frame substructure to accommodate at least one of: (i) variations in terrain, and (ii) desired slope of a decking surface, without needing to cut the ramp frame substructure;

(c) installing a plurality of deck boards on the ramp frame substructure, using dimensional lumber; and (d) installing post décor and railings on the ramp frame substructure.

40. The method of claim 39, wherein adjusting aspects of the ramp frame structure includes:

(a) performing a coarse adjustment using a coarse adjustment mechanism; and (b) performing a fine adjustment using a fine adjustment mechanism, in smaller increments than can be achieved using the coarse adjustment mechanism.

\* \* \* \* \*